United States Patent
Klarakis et al.

(10) Patent No.: US 10,884,633 B2
(45) Date of Patent: Jan. 5, 2021

(54) SYSTEM AND METHOD FOR OPTIMIZED SIGNATURE COMPARISONS AND DATA REPLICATION

(71) Applicant: HEWLETT PACKARD ENTERPRISE DEVELOPMENT LP, Houston, TX (US)

(72) Inventors: George A. Klarakis, Chestnut Hill, MA (US); Yan Xiao, Acton, MA (US); Thomas G. Olson, Sturbridge, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 943 days.

(21) Appl. No.: 14/994,512

(22) Filed: Jan. 13, 2016

(65) Prior Publication Data

US 2016/0202927 A1    Jul. 14, 2016

Related U.S. Application Data

(60) Provisional application No. 62/102,808, filed on Jan. 13, 2015.

(51) Int. Cl.
*H04L 29/08* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 3/0665* (2013.01);
(Continued)

(58) Field of Classification Search
CPC ...................................................... G06F 3/065
(Continued)

(56) References Cited

U.S. PATENT DOCUMENTS 7,100,089 B1 * 8/2006 Phelps .................. G06F 3/0607
711/162
7,103,595 B2   9/2006 Anastasiadis et al.
(Continued)

FOREIGN PATENT DOCUMENTS

CN       102378969 A    3/2012
WO    2012067964 A1    5/2012

OTHER PUBLICATIONS

Rhea et al., Fast, Inexpensive Content-Addressed Storage in Foundation, 2008 ("Rhea")(SPR00000354-SPR00000367).
(Continued)

*Primary Examiner* — Vivek Srivastava
*Assistant Examiner* — Sibte H Bukhari
(74) *Attorney, Agent, or Firm* — Jaffery Watson Mendonsa & Hamilton

(57) ABSTRACT

Systems, methods, and computer-readable storage media for inter-node data replication while reducing network traffic for remote backup. A system receives a command to duplicate a dataset, located on a source network node, to a remote network node, accesses, on the source network node, signatures of a previous snapshot of the dataset and signatures of a current snapshot of the dataset, performs, at the source network node, a local signature comparison between the previous snapshot and the current snapshot to identify one or more signatures that do not match, sends the signatures that do not match to the remote network node, searches, on the remote network node, for the signatures that do not match, and sends data associated with the signatures that do not match to the remote network node for incorporation within a current remote snapshot if they do not exist on a current remote network node.

20 Claims, 11 Drawing Sheets

(51) Int. Cl.
*H04L 12/28* (2006.01)
*G06F 11/14* (2006.01)

(52) U.S. Cl.
CPC ...... *G06F 11/1453* (2013.01); *G06F 11/1464* (2013.01); *H04L 12/2854* (2013.01); *G06F 11/1451* (2013.01); *G06F 2201/815* (2013.01); *G06F 2201/83* (2013.01); *G06F 2201/84* (2013.01)

(58) Field of Classification Search
USPC .......................................................... 709/217
See application file for complete search history.

(56) References Cited

U.S. PATENT DOCUMENTS

| | | | |
|---|---|---|---|
| 7,139,781 | B2 | 11/2006 | Young |
| 7,454,592 | B1 | 11/2008 | Shah |
| 7,747,663 | B2 | 6/2010 | Atkin |
| 7,814,078 | B1 | 10/2010 | Forman |
| 8,028,106 | B2 | 9/2011 | Bondurant et al. |
| 8,140,625 | B2 | 3/2012 | Dubnicki |
| 8,140,786 | B2 | 3/2012 | Bunte et al. |
| 8,478,799 | B2 | 7/2013 | Beaverson et al. |
| 8,510,219 | B1 | 8/2013 | Natanzon et al. |
| 8,909,605 | B1 | 12/2014 | Li |
| 9,009,429 | B2 | 4/2015 | Kapanipathi et al. |
| 2004/0148306 | A1 | 7/2004 | Moulton |
| 2005/0038818 | A1* | 2/2005 | Hooks .............. G06F 11/0748 |
| 2006/0036898 | A1 | 2/2006 | Doering |
| 2009/0222509 | A1* | 9/2009 | King .................. G06F 16/182 709/203 |
| 2010/0115620 | A1 | 5/2010 | Alme |
| 2014/0101113 | A1 | 4/2014 | Zhang et al. |
| 2015/0127710 | A1* | 5/2015 | Ady ........................ H04W 4/21 709/202 |
| 2016/0119366 | A1* | 4/2016 | Alme .................. G06F 21/563 726/23 |

OTHER PUBLICATIONS

Richie et al., The UNIX Time-Sharing System, 1974 ("Richie")(SPR00000368-SPR00000378).
Levanoni et al., An On-the-Fly Reference-Counting Garbage Collector for Java, 2001 ("Levanoni")(SPR00000379-SPR00000445).
Boehm et al., Garbage Collection in an Uncooperative Environment, 1998 ("Boehm")(SPR00000446-SPR00000462).
1003.1™ Standard for Information Technology—Portable Operating System Interface (POSIX®), System Interfaces, Issue 6, 2001 ("POSIX_S1_2001")(SPR00000463-SPR00000464).
Harel Paz, Efficient Memory Management for Servers, 2006 ("Paz")(SPR00000465-SPR00000692).
Grembowski et al., Comparative Analysis of the Hardware Implementations of Hash Functions SHA-1 and SHA-512, 2002 ("Grembowski")(SPR00000693-SPR00000707).
Chaves et al., Cost-Efficient SHA Hardware Accelerators, 2008 ("Chaves")(SPR00000708-SPR00000717).
Hitz et al., File System Design for an NFS File Server Appliance, 1994 ("Hitz")(SPR00000718-SPR00000740).
Kawaguchi et al., A Flash-Memory Based File System, 1995 ("Kawaguchi")(SPR00000741-SPR00000750).
You et al., Deep Store: An Archival Storage System Architecture, 2005 ("You")(SPR00000751-SPR00000762).
McKusick et al., A fast file system for UNIX, 1984 ("McKusick")(SPR00000763-SPR00000779).
The EMC Centera and TOWER Technology Advantage, 2002 ("Centera")(SPR00000780-SPR00000787).
Hutchinson et al., Logical vs. Physical File System Backup, 1999 ("Hutchinson")(SPR00001594-1605).
USPTO PTAB Decision Denying Institution of Inter Partes Review entered Mar. 22, 2017, *Springpath, Inc.* v. *SimpliVity Corp.*, Case IPR2016-01780, U.S. Pat. No. 8,478,799 B2.
USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted).
Int'l Preliminary Report on Patentability dated Nov. 15, 2016 in corresponding Int'l Appln. Nol. PCT/US2016/013194.
IBM, AIX 5L Version 5.2 General Programming Concepts: Writing and Debugging Programs, 2004 ("GPC")(SPR00000788-SPR00001403).
IBM, AIX 5L Version 5.2 System Management Concepts: Operating System and Devices, 2004 ("SMC")(SPR00001404-SPR00001593).
Int'l. Search Report and Written Opinion dated Apr. 13, 2016 in corresponding Int'l. Appln. No. PCT/US2016/013194.
Springpath Inc.'s Preliminary Invalidity Contentions, C.A. No. 4:15-cv-13345-Tsh Document 101, filed Mar. 21, 2017 in the US Disctrict Court for the District of Massachusetts and Exhibit A1, listing references cited herein.
Li et al., Secure Untrusted Data Repository (SUNDR), 2004 ("Li")(SPR00000113-PR000000128).
Sandberg et al., Design and implementation of the Sun network filesystem, 1985 ("Sandberg")(SPR00000129-SPR00000140).
Quinlan et al, Venti: A New Approach to Archival Storage, 2002 ("Quinlan")(SPR00000141-SPR00000154).
Best et al., JFS Layout: How the Journaled File System Handles the On-Disk Layout, 2000 ("Best")(SPR00000155-SPR00000197).
Zhu et al., Avoiding the Disk Bottleneck in the Data Domain Deduplication File System, 2008 ("Zhu")(SPR00000198-SPR00000211).
Abd-El-Malek et al., Ursa Minor: Versatile Cluster-Based Storage, 2005 ("Abd-El-Malek")(SPR00000212-SPR00000225).
Bobbarjung et al., Improving Duplicate Elimination in Storage Systems, 2006 ("Bobbarjung")(SPR00000226-SPR00000248).
Cox et al., Pastiche: Making Backup Cheap and Easy, 2002 ("Cox")(SPR00000249-SPR00000263).
Dabek et al., Wide-Area Cooperative Storage With CFS, 2001 ("Dabek")(SPR00000264-SPR00000277).
Debnath et al., ChunkStash: Speeding up Inline Storage Deduplication Using Flash Memory, 2010 ("Debnath")(SPR00000278-SPR00000292).
Fu et al., Fast and Secure Distributed Read-Only File System, 2000 ("Fu 2000")(SPR00000293-SPR00000308).
Fu et al., Fast and Secure Distributed Read-Only File System, 2002 ("Fu")(SPR00000309-SPR00000332).
Mesnier et al., Object-Based Storage, 2003 ("Mesnier")(SPR00000333-SPR00000339).
Muthitacharoen et al., Ivy: A Read/Write Peer-to-Peer File System, 2002 ("Muthitacharoen")(SPR00000340-SPR00000353).
Petition for Inter Partes Review of U.S. Pat. No. 8,478,799 before the USPTO Patent Trial and Appeal Board dated Sep. 14, 2016, Case IPR2016-01779.
Declaration of Darrell D.E.Long, Ph.D. Regarding U.S. Pat. No. 8,478,799 dated Sep. 14, 2016, Case IPR2016-01779 (Springpath Exhibit 1002).
Li, et al., Secure Untrusted Data Repository (SUNDRU), OSDI '04: 6th Symposium on Operating Systems Design and Implementation, pp. 122-136, USENIX Association (Springpath Exhibits 1003 & 1103).
Sandberg, et al., Design and Implementation of the Sun Network Filesystem, Sun Microsystems, Mountain View, CA, (12 pp.) (Springpath Exhibits 1004 & 1116).
U.S. Patent and Trademark Office non-final Office Action dated Aug. 30, 2012 in U.S. Appl. No. 12/823,922 (Springpath Exhibits 1006 & 1106).
Response to USPTO non-final Office Action of Aug. 30, 2012 filed Dec. 18, 2012 in U.S. Appl. No. 12/823,922 (Springpath Exhibits 1009 & 1109).
Quinlan, et al., Venti: a new approach to archival storage, Bell Labs, Lucent Technologies, 1-13 pp (Springpath Exhibits 1008 & 1108).
U.S. Patent and Trademark Office final Office Action dated Feb. 22, 2013 in U.S. Appl. No. 12/823,922 (Springpath Exhibits 1010 & 1110).

(56) References Cited

OTHER PUBLICATIONS

Response to USPTO final Office Action of Feb. 22, 2013 filed May 8, 2013 in U.S. Appl. No. 12/823,922 (Springpath Exhibits 1012 & 1112).
Best, et al., How the Journaled File System handles the on-disk layout, May 2000, IBM: developerWorks: Linux library/Open source library Internet download Apr. 18, 2001; http://swgiwas001.sby.ibm.com/developerworks/library/jfslayout/index1.html (Springpath Exhibits 1011 & 1111).
U.S. Patent and Trademark Office Notice of Allowance dated May 29, 2013 in U.S. Appl. No. 12/823,922 (Springpath Exhibits 1013 & 1113).
Petition for Inter Partes Review of U.S. Pat. No. 8,478,799 before the USPTO Patent Trial and Appeal Board dated Sep. 14, 2016, Case IPR2016-01780.
Declaration of Darrell D.E.Long, Ph.D. Regarding U.S. Pat. No. 8,478,799 dated Sep. 14, 2016, Case IPR2016-01780 (Springpath Exhibit 1102).
IEEE The Open Group, 1003.1TM Standard for Information Technology—Portable Operating System Interface (POSIX (R)) System Interfaces, Issue 6, IEEE Std 1003.Jan. 2001, Approved Sep. 12, 2001 The Open Group (2 pp.) (Springpath Exhhibits 1014 & 1114).
IEEE the Open Group, 1003.1TM Standard for Information Technology—Portable Operating System Interface (POSIX (R)) Base Definitions, Issue 6, IEEE Std 1003.1-2001, Approved Sep. 12, 2001 The Open Group (8 pp.) (Springpath Exhibits1015 & 1115).
USPTO PTAB Decision Denying Institution of Inter Partes Review entered Mar. 22, 2017, *Springpath, Inc.* v. *SimpliVity Corp.*, Case IPR2016-01779, U.S. Pat. No. 8,478,799 B2.
USPTO PTAB Patent Owner's Preliminary Response dated Dec. 27, 2016, *Springpath, Inc.* v. *SimpliVity Corp.*, Case IPR2016-01779, U.S. Pat. No. 8,478,799 B2 (SimpliVity Exhibits 2001-2009 listed below).
Wikipedia: "Object Storage" (available at https://en.wikipedia.org/wiki/Object_storage) (last visited Dec. 6, 2016), SimpliVity Exhibit 2001, *Springpath* v. *SimpliVity* IPR2016-01779.
Webopedia: "Inode" (available at http://www.webopedia.com/TERM/1/inode.html) (last visited Dec. 20, 2016), SimpliVity Exhibit 2002, *Springpath* v. *SimpliVity* IPR2016-01779.
Presentation: "Object Storage technology," Storage Networking Industry Association, 2013 (available at http://www.snia.org/sites/default/education/tutorials/2013/spring/file/BrentWelch_Object_Storage_Technology.pdf) (last visited Dec. 22, 2016), SimpliVity Exhibit 2003, *Springpath* v. *SimpliVity* IPR2016-01779.
"Object Storage versus Block Storage: Understanding the Technology Differences," Aug. 14, 2014 (available at http://www.druva.com/blog/object-storage-versus-block-storage-understanding-technology-differences/) (last visited Dec. 22, 2016), SimpliVity Exhibit 2004, *Springpath* v. *SimpliVity* IPR2016-01779.
"Understanding Object Storage and Block Storage use cases," Jul. 20, 2015 (available at http://cloudacademy.comm/blog/object-storage-block-storage/) (last visited Dec. 22, 2016), SimpliVity Exhibit 2005, *Springpath* v. *SimpliVity* IPR2016-01779.
"OBFS: A File System for Object-based Storage Devices." Feng, et al., 2004, SimpliVity Exhibit 2006, *Springpath* v. *SimpliVity* IPR2016-01779.
"Oasis: An active storage framework for object storage platform," Xie, et al., 2015, SimpliVity Exhibit 2007, *Springpath* v. *SimpliVity* IPR2016-01779.
Wikipedia: "Namespace" (available at https://en.wikipedia.org/wiki/Namespace) (last visited Dec. 6, 2016), SimpliVity Exhibit 2008, *Springpath* v. *SimpliVity* IPR2016-01779.
Weopedia: "Namespace" (available at http://www.webopedia.com/TERM/N/namespace.html) (last visited Dec. 20, 2016), SimpliVity Exhibit 2009, *Springpath* v. *SimpliVity* IPR2016-01779.
Petition for Inter Partes Review of U.S. Pat. No. 8,478,799 filed Aug. 11, 2017, case IPR2017-01933, 92 pages. The citations from PIR2017-01933 are submitted herewith below.
Prosecution History of the U.S. Pat. No. 8,478,799 patent, 576 pages.
U.S. Appl. No. 61/269,633, 32 pages.
Prasrant Shenoy, "Declaration of Prashant Shenoy, PhD, Under 37 C.F.R. § 1.68 in Support of Petition for Inter Partes Review of U.S. Pat. No. 8,478,799", dated Aug. 11, 2017, 196 pages.
"Curriculum Vitae of Dr. Prashant Shenoy", 2017, 31 pages.
Athicha Muthitacharoen, et al., "Ivy: A Read/Write Peer-to-Peer System," Proceedings of the 5th Symposium on Operating Systems Design and Implementation (OSDI '02), Operating Systems Review, vol. 36, Issue SI (Winter 2002), 21 pages.
Frank Dabek, et al., "Wide-area cooperative storage with CFS," Proceedings of the 18th ACM Symposium on Operating Systems Principles (SOSP'01), Operating Systems Review, vol. 35, No. 5 (Dec. 2001), pp. 1-19.
Nitin Agrawal, et al., "Design Tradeoffs for SSD Performance," USENIX'08: 2008 USENIX Annual Technical Conference, Jun. 25, 2008, pp. 57-70.
Marshall Kirk McKusick, et al., "The Design and Implementation of the FreeBSD Operating System", FreeBSD version 5.2, CSCO-1011, (2005), pp. 1-43.
Josh Cates, "Robust and Efficient Data Management for a Distributed Hash Table", Jun. 2003, 64 pages.
Marice J. Bach, The Design of the UNIX Operating System (1986), 8 pages.
Prashant Shenoy, et al., "Symphony: An Integrated Multimedia File System," Proceedings of SPIE 3310, Multimedia Computing and Networking 1998, pp. 124-138.
Garth Gibson, et al., "A Cost-Effective, High-Bandwidth Storage Architecture," Proceedings of the 8th Conference on Architectural Support for Programming Languages and Operating Systems, 1998, pp. 92-103.
Mike Mesnier, et al., "Object-Based Storage," IEEE Communications Magazine, Aug. 2003, pp. 84-90.
R. Rivest, "The MD5 Message-Digest Algorithm," Request for Comments 1321, Internet Engineering Task Force, CSCO-1017, Apr. 1992, 21 pages.
Sean Quintan, et al., "Venti: a new approach to archival storage," Proceedings of Fast 2002 Conference of File and Storage Technologies, Jan. 28-30, 2002, pp. 1-14.
Bruce Eckel, "C++ Inside & Out", 1992, 6 pages.
Mendel Rosenblum, "The Design and Implementation of a Log Logstructuredfile System", Kluwer Academic Publishers, 1995, 3 pages.
Webster's New World Computer Dictionary, 10th Ed. 2003, 3 pages.
Microsoft Computer Dictionary, 5th Ed., 2002, 7 pages.
"AMD Athlon Processor", ADM Technical Brief, Publication # 22054, Rev. D, Issue date Dec. 1999, 10 pages.
Stevens, et al., "The first collision for full SHA-1," International Association for Cryptology Research 2017, pp. 570-596.
Andrew S. Tanenbaum, "Modern Operating Systems", 2d Ed., 2001, 7 pages.
Alan Freedman, "Computer Desktop Encyclopedia 9th Ed", Osborne/McGraw-Hill, 2001, 7 pages.
Sang-Won Lee. et al., "A Case tor Hash Memory SSD in Enterprise Database Applications," Proceedings of the 2008 ACM SIGMOD International Conference on Management of Data, Jun. 9-12, 2008, pp. 1075-1086.
Bruce Schneier, "Applied Cryptography, 2d Ed, Protocol, Algorithms, and Source Code in C", John Wiley & Sons, Inc., 1996, 4 pages.
Martin Piacek, "Storage Exchange: A Global Platform for Trading Distributed Storage Services," Master of Engineering Science Thesis, The University of Melbourne, Australia, Jul. 2006, 185 pages.
Ragib Hasan, et al., "A Survey of Peer-to-Peer Storage Techniques for Distributed File Systems," International Conference on Information Technology: Coding and Computing, 2005, 9 pages.
"Frequently Asked Questions for FreeBSD 2.X, 3.X and 4.X", unknown date, 8 pages, Archived at https://web.archive.org/web/20020404064240/http://www.freebsd.org:80/doc/en_US.ISO8859-1/books/faq/install.html.
"Preliminary Information, AMD Athlon, Processor Module Data Sheet", AMD Athlon, Publication #21016, Rev. M, Issue Date: Jun. 2000, 74 pages.

(56) References Cited

OTHER PUBLICATIONS

AMD Athlon™, "Processor Quick Reference FAQ", Feb. 3. 2000, 12 pages.
"Marc Record Information for Operating Systems Review"—Proceedings of the Fifth ACM Symposium on Operating Systems Design and Implementation (OSDI'02), available at the WRLC online catalog, accessed Jul. 20, 2017, 3 pages.
"Bibliographic Record Information for Operating Systems Review"—Proceedings of the Fifth ACM Symposium on Operating Systems Design and Implementation (OSDI'02), Dec. 9-11, 2002, available at the WRLC online catalog, accessed Jul. 20, 2017, 2 pages.
"MARC Record Information for Operating Systems Review"—Proceedings of the 18th ACM Symposium on Operating Systems Principles (SOSP'01), 2001, available at the online catalog of the Library of Congress, accessed Jul. 31, 2017, 3 pages.
"Bibliographic Record information for Operating Systems Review"—Proceedings of the 18th ACM Symposium on Operating Systems Principles (SOSP'01), 2001, available at the online catalog of the Library of Congress, accessed Jul. 31, 2017, 3 pages.
"Operating Systems Review"—Proceedings of the 18th ACM Symposium on Operating Systems Principles (SOSP'01), vol. 35, No. 5, pp. 202-215, Oct. 21-24, 2001, obtained from a CD-ROM from Auburn University, 11 pages.
"MARC Record Information for Operating Systems Review"—Proceedings of the 18th ACM Symposium on Operating Systems Principles (SOSP'01), Oct. 21-24, 2001, CD-ROM, available at the Auburn University Library online catalog, accessed Jul. 28, 2017, 1 page.
"Bibliographic: Record information for Operating Systems Review"—Proceedings of the 18th ACM Symposium on Operating Systems Prindpies (SOSP'01) CD-ROM, Oct. 21-24, 2001, available at the Auburn University Library online catalog, accessed Jul. 28, 2017, 1 pages.
"Scan of CD-ROM and CD-ROM Case, Operating Systems Review"—Proceedings of the 18th ACM Symposium on Operating Systems Principles (SOSP'01), Oct. 21-24, 2001, CD-ROM obtained from the Auburn University Library, 1 page.
Byung-Gon Chun, et al., "Efficient Replica Maintenance for Distributed Storage Systems," USENIX Association, Proceedings of NSDI '06: 3rd Symposium on Networked Systems Design & Implementation, 2006, pp. 45-58.
Dabek, F., et al., "Wide-area cooperative storage with CFS," Operating Systems Review—Proceedings of the 18th ACM Symposium on Operating Systems Principles (SOSP'01), 'vol. 35, No. 5, 2001, pp. 202-215.
Ingrid Hsieh-Yee, "Declaration of Ingrid Hsieh-Yee, PhD, Under 37 C.F.R. § 1.68 in Support of Petition for Inter Partes Review of U.S. Pat. No, 8,478,799", dated Aug. 10, 2017, 77 pages.
Michele Nelson, "Declaration of Michele Nelson, Under 37 C.F.R. § 1.68", dated Aug. 9, 2017, 92 pages.
David Bader, "Declaration of David Bader, Under 37 C.F.R. §1.68", dated Aug. 10, 2017, 31 pages.
MARC Record Information,"The Design and Implementation of the FreeBSD Operating System", 2005, 2 pages, available at the online catalog of the Library of Congress, accessed Aug. 3, 2017.
Bibliographic Record information, "The Design and Implementation of the FreeBSD Operating System", 2005, 2 pages, available at the online catalog of the Library of Congress, accessed Aug. 3, 2017.
Marshall Kirk McKusick, et al,, "The Design and Implementation of the FreeBSD Operating System", FreeBSD version 5.2, 2005, 32 pages, obtained from the George Mason University Library.
Marc Record Information, "The Design and Implementation of the FreeBSD Operating System" 2005, 2 pages, available at the online catalog of the George Mason University Library, accessed Aug. 3, 2017.
Bibliographic Record Information for "The Design and Implementation of the FreeESD Operating System", 2005, 2 pages, available at the online catalog of the George Mason University Library, accessed Aug. 3, 2017.
USENIX Association, "Proceedings of the First Symposium on Networked Systems Design and Implementation," Mar. 2004, pp. 1-15, San Francisco, CA, USA.
Simplivity Corporation's Reply Claim Construction Brief, Case 4:15-cv-13345-TSH, Document 132, Jul. 24, 2017, pp. 1-23.
Simplivity Corporation's Opening Claim Construction Brief, Case 4:15-cv-13345-TSH, Document 130, Jul. 10, 2017, pp. 1-21.
SimpliVity Corporation's Markman Hearing Transcript, Case No. 15cv13345-TSH, Aug. 16, 2017, pp. 1-119.
Petitioner's Reply to Patent Owner's Preliminary Response, Case IPR2017-01933, U.S. Pat. No. 8,478,799, Feb. 28, 2018, pp. 1-17.
Patent Owner's Preliminary Response Pursuant to 37 CFR 42.107(a), Case IPR2017-01933, U.S. Pat. No. 8,478,799, Dec. 21, 2017, pp. 1-47.
Joint Claim Construction and Prehearing Statement, Case 4:15-cv-13345-TSH, Document 136, Aug. 7, 2017, pp. 1-8.
Hewlett Packard Enterprise Company's Response to Springpath's Supplemental Claim Construction Brief, C.A. No. 4:15-cv-13345-TSH, Oct. 30, 2017, pp. 1-5.
Frank Dabek, "A Distributed Hash Table," Sep. 2005, pp. 1-135, Massachusetts Institute of Technology.
Defendant Springpath, Inc.'s Repiy Claim Construction Brief, Case 4:15-cv-13345-TSH, Document 133, Jul. 24, 2017, pp. 1-17.
Defendant Springpath, Inc.'s Preliminary Claim Construction Brief with Exhibits, Case 4:15-cv-13345-TSH, Document 129, Jul. 10, 2017, pp. 1-138.
Defendant Springpath, Inc.'s Motion for Leave to File Supplemental Claim Construction Brief, Case 4:15-cv-13345-TSH, Document 146, Oct. 17, 2017, pp. 1-5.
Decision Denying Institution of Inter Partes Review, Case IPR2017-01933, U.S. Pat. No. 8,478,799 B2, Mar. 16, 2018, pp. 1-18, USPTO.

\* cited by examiner

SYSTEM AND METHOD FOR OPTIMIZED SIGNATURE COMPARISONS AND DATA REPLICATION

PRIORITY

This application claims the benefit of U.S. Provisional Application No. 62/102,808, filed Jan. 13, 2015, the disclosure of which is incorporated herein by reference in its entirety.

TECHNICAL FIELD

The present invention relates to data replication, and more specifically to systems and methods for performing signature comparisons for data storage backups or other data copying operations.

BACKGROUND

Computer servers and clusters of computer servers are increasingly moving towards virtual machines to provide computing services. In such an environment, administrators often configure remote backup tasks for virtual machines. During a remote backup, a snapshot of a source virtual machine's data is replicated to a target (e.g., a remote datacenter).

In current solutions, the signatures are sent to, and comparisons are performed on, the target, which typically resides across a WAN connection. WAN connections are typically slow and costly, with many other tasks competing for bandwidth on a WAN connection. Due to the fact that a single remote backup task can trigger millions of signature comparisons, the increasingly common and large scale backup tasks can cause significant delays, congest WAN connections, and occupy server resources.

SUMMARY

Systems, methods, and computer-readable media are provided for improved remote backup operations which can reduce WAN traffic and remote backup duration. In response to a remote backup command, a source network node performs a local signature comparison between previous and current snapshots of a dataset. In this manner, the source network node need send only the signatures that do not match locally to the remote network node. The remote network node can then search for the signatures that do not match, and send a response to the source network node identifying signatures that do not exist on the remote network node. The source network node subsequently sends the data associated with only the signatures that do not exist on the remote network node for incorporation into a remote snapshot of the dataset.

A system operating according to the present disclosure particularly benefits certain remote backup use cases, such as particularly large virtual disks (VMDKs) ranging in size of up to hundreds of gigabytes or more with heavy random write usage patterns, where a large percentage of signature comparisons would result in matches. The system can reduce a significant percentage of remote signature comparisons sent across the WAN. The system also reduces the overall WAN utilization due to a reduction in the number of remote signature comparisons. In addition, the system shortens the duration of remote backup across high latency WAN environments. The system may further reduce the time required to complete a remote backup, even in low latency LAN environments.

In some embodiments, the system includes a recognition algorithm that detects usage patterns leading to poor performance. Upon recognizing such a usage pattern, the system applies a different backup approach, whether applying a different specialized backup routine, or defaulting to a standard or conventional backup routine.

In accordance with one embodiment of the present disclosure, there is provided a system including a source network node and a remote network node, each node having a processor and a memory storing instructions which, when executed by the processor, cause the processor to perform operations for generating a remote backup copy on the remote network node of a dataset located on the source network node, comprising:

receiving a command to duplicate the dataset, located on the source network node, to the remote network node, the dataset comprising signatures of data and metadata in a tree structured file system, wherein the file system data and metadata are stored as objects in an object store, each object having a globally unique content-derived signature;

in response to the command, accessing, on the source network node, signatures of a previously stored snapshot of the dataset and signatures of a current snapshot of the dataset, wherein the previous snapshot comprises a tree of the signatures of the data and metadata objects of a tree structured file system, and wherein the previous snapshot stored on the source network node corresponds to a previous remote snapshot stored at the remote network node;

performing, at the source network node, a local signature comparison between the previous snapshot and the current snapshot to identify one or more signatures that do not match between the previous snapshot and the current snapshot, wherein the local signature comparison is an iterative top-down comparison beginning at the root of the tree, and wherein the signatures that do not match have at least one of different content or different placement in the tree;

sending the signatures that do not match to the remote network node;

performing, on the remote network node, a search for the signatures that do not match;

receiving, from the remote network node, a response of whether the signatures that do not match exist at the remote network node; and if the signatures that do not match do not exist at the remote network node, sending data associated with the signatures that do not match to the remote network node for incorporation within a current remote snapshot.

In one embodiment, the source network node and the remote network node communicate across a wide area network (WAN).

In one embodiment, the signatures that do not match are sent asynchronously across the WAN.

In one embodiment, the signatures that do not match are batched prior to sending across the WAN.

In one embodiment, the batched signatures include signatures from different sibling nodes of the tree.

In accordance with another embodiment of the present disclosure, there is provided a method for generating a remote backup copy on the remote network node of a dataset located on the source network node, comprising:

receiving a command to duplicate a dataset, located on a source network node, to a remote network node, the dataset comprising signatures of data and metadata in a tree structured file system, wherein the file system data and metadata are stored as objects in an object store, each object having a globally unique content-derived signature;

in response to the command, accessing, on the source network node, signatures of a previously stored snapshot of the dataset and signatures of a current snapshot of the dataset, wherein the previous snapshot comprises a tree of the signatures of the data and metadata objects of a tree structured file system, and wherein the previous snapshot stored on the source network node corresponds to a previous remote snapshot stored at the remote network node;

performing, at the source network node, a local signature comparison between the previous snapshot and the current snapshot to identify one or more signatures that do not match between the previous snapshot and the current snapshot, wherein the local signature comparison is an iterative top-down comparison beginning at the root of the tree, and wherein the signatures that do not match have at least one of different content or different placement in the tree;

sending the signatures that do not match to the remote network node;

performing, on the remote network node, a search for the signatures that do not match;

receiving, from the remote network node, a response of whether the signatures that do not match exist at the remote network node; and if the signatures that do not match do not exist at the remote network node, sending data associated with the signatures that do not match to the remote network node for incorporation within a current remote snapshot.

In one embodiment, the source network node and the remote network node communicate across a wide area network (WAN).

In one embodiment, the signatures that do not match are sent asynchronously across the WAN.

In one embodiment, the method includes batching the signatures that do not match prior to sending across the WAN.

In one embodiment, the batched signatures include signatures from different sibling nodes of the tree.

In accordance with another embodiment of the present disclosure, there is provided a non-transitory computer-readable storage medium having stored therein instructions which, when executed by a processor, cause the processor to perform operations comprising:

receiving a command to duplicate a dataset, located on a source network node, to a remote network node, the dataset comprising signatures of data and metadata in a tree structured file system, wherein the file system data and metadata are stored as objects in an object store, each object having a globally unique content-derived signature;

in response to the command, accessing, on the source network node, signatures of a previously stored snapshot of the dataset and signatures of a current snapshot of the dataset, wherein the previous snapshot comprises a tree of the signatures of the data and metadata objects of a tree structured file system, and wherein the previous snapshot stored on the source network node corresponds to a previous remote snapshot stored at the remote network node;

performing, at the source network node, a local signature comparison between the previous snapshot and the current snapshot to identify one or more signatures that do not match between the previous snapshot and the current snapshot, wherein the local signature comparison is an iterative top-down comparison beginning at the root of the tree, and wherein the signatures that do not match have at least one of different content or different placement in the tree;

sending the signatures that do not match to the remote network node;

performing, on the remote network node, a search for the signatures that do not match;

receiving, from the remote network node, a response of whether the signatures that do not match exist at the remote network node; and if the signatures that do not match do not exist at the remote network node, sending data associated with the signatures that do not match to the remote network node for incorporation within a current remote snapshot.

In one embodiment, the source network node and the remote network node communicate across a wide area network (WAN).

In one embodiment, the signatures that do not match are sent asynchronously across the WAN.

In one embodiment, the non-transitory computer-readable storage medium includes additional instructions which, when executed by the processor, cause the processor to perform operations including batching the signatures that do not match prior to sending across the WAN.

In one embodiment, the batched signatures include signatures from different sibling nodes of the tree.

Glossary

The following is a glossary of terms used in various embodiments of the present application:

HA: High availability.

Hive: A dataset, namely, the data and metadata of a tree structured file system.

Remote backup job (or Replication job): A ControlPlane job tracking a remote backup.

Replicate Task: A file system thread or thread group optimized for high latency links and copying large amounts of data from a source snapshot on a source network node a remote network (target) node for remote backup. The thread or thread group runs on the source node.

HA-protected backup: A remote backup which has a HA pair of target hives. The HA pair of target hives are referred to as passive primary and tertiary respectively.

BRIEF DESCRIPTION OF THE DRAWINGS

The invention will be more fully understood by reference to the detailed description, in conjunction with the following figures, wherein.

DETAILED DESCRIPTION

Figure 1:
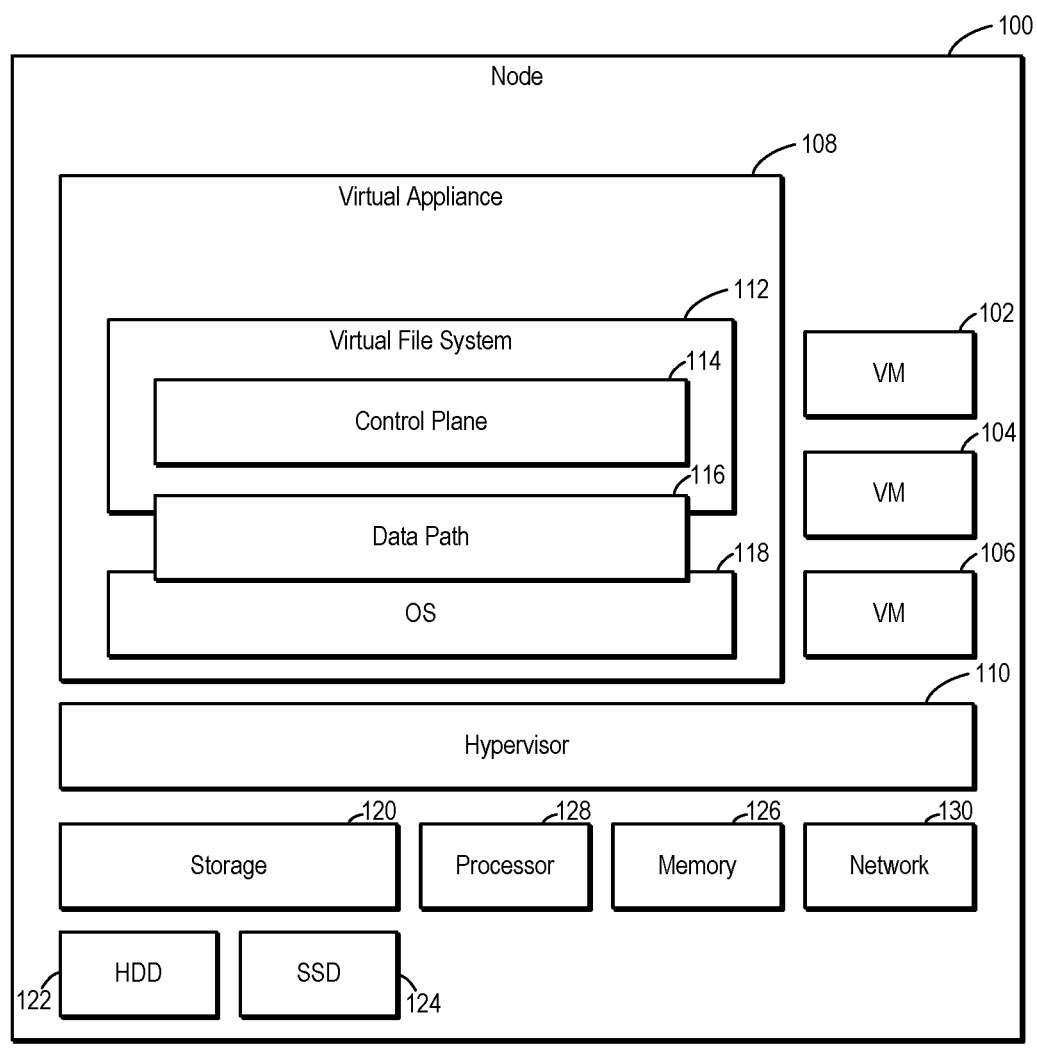
FIG. 1 illustrates a schematic block diagram of one embodiment of a node for use in one embodiment of the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Node System

FIG. 1 illustrates a schematic block diagram of one embodiment of a node 100. Node 100 can be a hyperconverged infrastructure node with a software-centric architecture that tightly integrates compute, storage, networking and virtualization resources and other technologies. For example, node 100 can be a commercially available system such as OmniCube® incorporating an OmniStack® file system available from SimpliVity Corporation, Westborough Mass. USA. Node 100 can host a number of guest virtual machines (VM) 102, 104 and 106, and can be configured to produce local and remote backups and snapshots of the virtual machines. In the practice of this invention, a plurality of such nodes may be arranged in a network as described below.

To do so, node 100 can include a virtual appliance 108 above a hypervisor 110. Virtual appliance 108 can include a virtual file system 112 in communication with a control plane 114 and a data path 116. Control plane 114 can handle data flow between applications and resources within node 100. Data path 116 can provide a suitable I/O interface between virtual file system 112 and an operating system (OS) 118, and can also enable features such as data compression, deduplication, and optimization.

Node 100 can also include a number of hardware components below hypervisor 110. For example, node 100 can include storage 120 which can be RAID storage having a number of hard disk drives (HDDs) 122 and/or solid state drives (SSDs) 124. Node 100 can also include memory 126 (e.g., RAM, ROM, flash, etc.) and one or more processors 128. Lastly, node 100 can include wireless and/or wired network interface components 130 to enable communication with other nodes.

Figure 2:
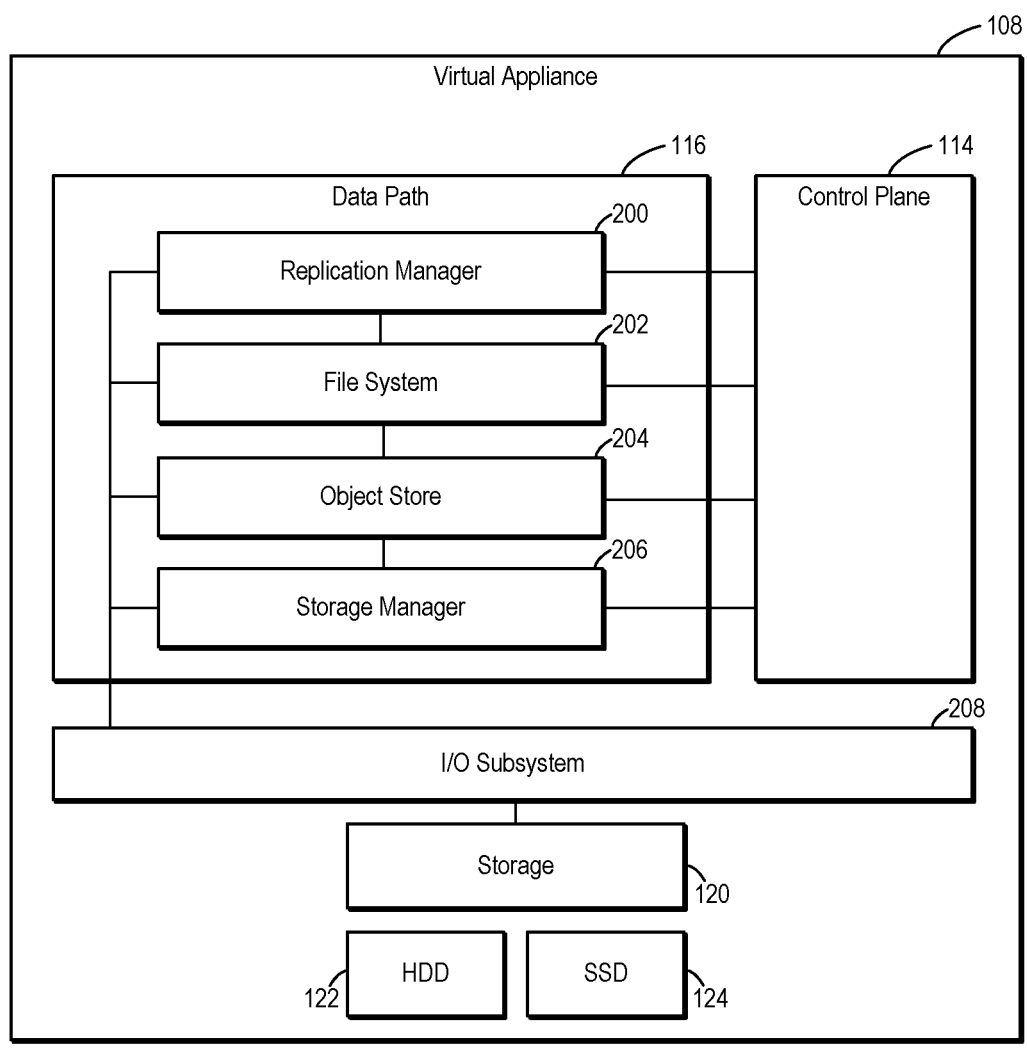
FIG. 2 illustrates a schematic block diagram of one embodiment of a data path subsystem.

Referring to FIG. 2, data path 116 is further decomposed. As illustrated, data path 116 includes a replication manager 200 configured to perform a remote backup using signature comparisons as described in detail in reference to FIG. 7. Data path 116 also includes a file system 202 in communication with control plane 114. File system 202 is responsible for managing file system components within data path 116 such as by instantiating file system components, maintaining directories and files within those directories, and the like. File system 202 also determines I/O processing capabilities of the node, and implements high availability by mirroring data writes from the primary node (e.g., node 100) to a secondary node.

File system 202 further provides both synchronous and asynchronous data transfer interfaces for various components within data path 116. As discussed in detail with reference to FIGS. 3-4, an object store 204 and storage manager 206 are responsible for data object I/O operations between data path 116 and I/O subsystem 208.

Virtual File System

Figure 3:
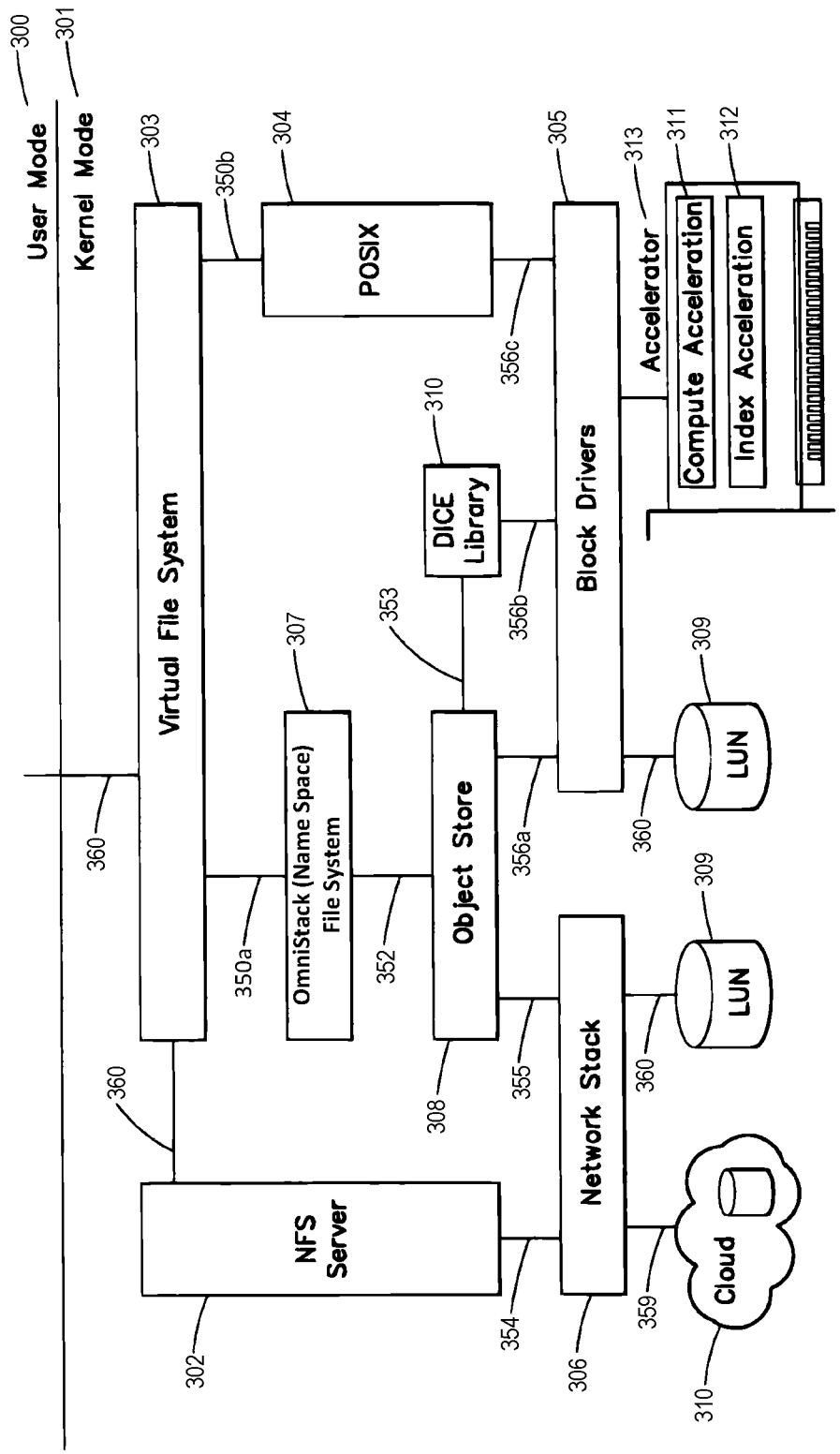
FIG. 3 illustrating a schematic block diagram of one embodiment of a virtual file system for use in the invention including an operating system kernel space.

Referring now to FIG. 3, shown is a schematic block diagram illustrating one embodiment of a virtual file system for use in the invention including an operating system kernel space as described in U.S. Pat. No. 8,478,799 granted Jul. 2, 2013 to Beaverson et al., the disclosure of which is incorporated herein by reference in its entirety. As illustrated, various storage components can be included in an operating system kernel 301. Although drawn from a Linux environment, the diagram can apply to other operating systems such as Windows®, Solaris® and other Unix class operating systems.

An example of a POSIX® 304 style file system is shown, where POSIX® can be any one of any number of file systems such as ResierFs, Exts, btrfs and zfs with no loss in generality. A virtual file system (VFS) layer 303 is used to abstract out many common features of file systems, and provides a consistent interface 360 to user space 300 and other components. The VFS 303 can have well-defined "lower edge" interfaces 350a, 350b that any file system can use to be recognized by the VFS 303 layer. In practice, there are typically many file systems working in parallel. In this example, the POSIX® file system 304 and OmniStack® (name space) file system 307 may operate in parallel File systems normally sit on top of a block storage abstraction, implemented by block drivers 305. The block storage may be on a Logical Unit Number LUN local storage device 309, or it may be on a remote LUN using an iSCSI protocol. Block Drivers 305 can also have well-defined interfaces in an operating system, such as interface 356a connecting to object store 308, interface 356b connecting to DICE library 310, and interface 356c connecting to POSIX® 304.

In this embodiment, the file system is composed of an OmniStack® (name space) file system 307 that is stacked on top of an object store 308 (e.g., as described in U.S. Pat. No.

8,478,799 to Beaverson et al.). The interface 352 between the OmniStack® file system 307 and object store 308 may be any of various industry standard object interfaces such as the ANSI T-10 object standard, or may be a non-standard object interface based on OmniStack® file system 307 and/or object store 308 requirements.

The object store 308 can be partitioned such that a library of commonly used functions, the Digest, Indexing, Compression, Encryption (DICE) library 310 is abstracted out, and can be connected to DICE library 310 through interface 353. The library 310 may be realized completely in software, or take advantage of a variety of hardware acceleration 313 techniques, one of which is illustrated. If using a hardware accelerator 313, that accelerator may have two broad classes of service: one for compute intensive operations 311 (compression, encryption, fingerprinting), and another for memory intensive operations 312 such as an index. A hardware implementation may have one or the other, or both.

The object store 308 creates an object container that may sit on top of a raw LUN, a partition on a disk, or a large file. It may also reference containers via a network stack 306 along interface 355 using protocols such as iSCSI or other remote access block protocols (FCoE being another example). A Network File System (NFS) 302 sits on top of the network stack 306 (via interface 354) and the NFS is connected to the VFS 303. The network stack 306 is connected to LUN 309 via interface 360, and to Cloud 310 via interface 359.

Figure 4:
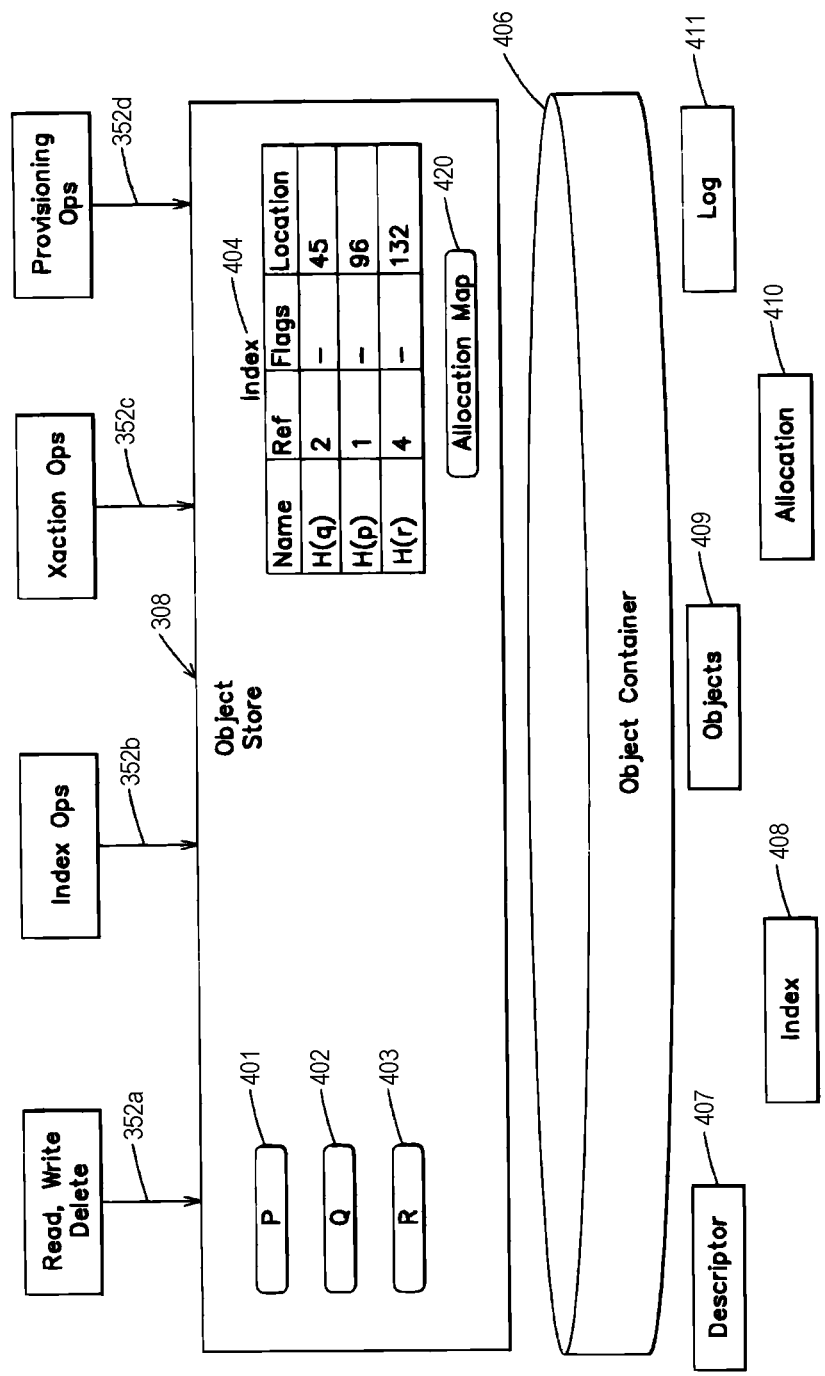
FIG. 4 illustrates a schematic block diagram of the major components of one embodiment of an object store.

Referring to FIG. 4, object store 308 is further decomposed. Object store 308 contains binary, opaque objects, examples of which are P 401, Q 402 and R 403. Objects may be of varying size, although in a preferred implementation they are powers of 2. An object resides at some offset in the container, which may be a byte offset, or an offset modulo the smallest object size (i.e., if the smallest object is 512 bytes, then the offset would be multiplied by 512 to get the byte offset).

Each object has a name, referred to herein as a signature or fingerprint, which is a cryptographic digest (hash) of the object's entire content. For example, in FIG. 4, the object names (signatures) are denoted by H(p), H(q) and H(r). In this manner, each object, which can include data and/or metadata, can have a globally unique signature derived from the content of its data.

An index structure 404 keeps track of (maps) object names, object locations, and object references. In this deduplicated file system and object store, a single copy of each unique data or metadata object may be stored, identified by its signature. An object's reference is incremented every time the object is written. In other words, while the OmniStack file system 307 may generate what it thinks are many copies of the same object, the object store 308 only stores one, but keeps track of how many the namespace actually thinks it has. In doing so, deduplication is native to the system.

The object store 308 can have several interface classes 352a-d. A read, write, delete interface 352a performs the stated functions. In this context, an object deletion is really a decrement of the object's reference count. Storage for the object inside the object store will be released only when the reference count goes to 0. Indexing operations 352b enable enumeration of objects by name, reference count adjustments, and looking up of objects by name. The object store 308 has transactional semantics (ACID properties), and transaction boundaries are managed through the transactional operations 352c. This includes starting, committing and aborting a transaction, in addition to listing of pending transactions. A provisioning interface 352d enables object stores to be created, deleted, merged, split and aggregated.

The index 404 is a map whose primary key is the object name (signature). There is an index entry for every object in the system. Each entry contains:

a) a signature of the object's content. Signatures are generated by a cryptographic digest (hash) of the content.

b) a reference count indicating how many times the object is referenced. The reference count may use saturating arithmetic to save space. For example, it may only use 8 bits to track references: the reference count can be added and decremented, but if it equals or exceeds 255, the count "saturates", and no further decrements are allowed. Because objects have reference counts, to the extent there are identical objects, deduplication is native to the system.

c) a physical locator. If the object is on a physical disk, this may be a logical block number LBN. If the object is hosted by a hosting provider (e.g., Amazon S3), then it can be a reference to the cloud object.

d) flags for various uses. One flag indicates if the object is stored compressed or not, another if encrypted or not. Other flags are available, but are not allocated to a specific use.

An allocation map 420 is a bitmap used for allocated blocks on the object container 406. An object container 406 is a randomly addressable persistent storage abstraction. Examples include a raw LUN, a file, a partition on a disk, or an iSCSI device across the Wide Area Network (WAN) (i.e., a telecommunications network or computer network that extends over a large geographical distance, such as a distance greater than 60 miles). The object container 406 can have several components 407-411 (not shown to scale). Aside from the container descriptor block 407, which lives at a known offset, the order of the other components is not material. An object index 408 may have container resident portions, or portions of index 404, or both, such as a B-tree or another tree structure. The allocation map 420 also may be partially on disk and in index 404. Migration between the two can be accomplished with paging techniques.

As the object store is modified, a transaction log 411 is kept on persistent storage. The log tracks all object activity, including reads, writes, deletes, reference adjustments, and so forth. The log is kept in time order, and is periodically rolled into main index 408. Object activity must "hit" on the log first before searching the main index. Each log entry consists of an operation type 352a, 352b, 352c, 352d, the fingerprint, reference count, transaction ID or epoch number, and pool location. A log entry is structurally similar to an index entry, with the addition of the transaction ID.

Global object naming enables the object store to move objects around while still preserving consistent naming and access. Reasons for moving an object include:

a) Moving related objects close to each other on a physical disk, for performance reasons.

b) Replicating objects across fault boundaries. This can be across two separate local disks, a local disk and a remote disk, or any multiple thereof. Replication can also confer read performance benefits. Replication can also include splitting objects, such as with erasure codes.

c) Background operations on objects such as compression, decompression, encryption, decryption.

d) Moving objects based on their frequency or expected frequency of use.

Figure 5:
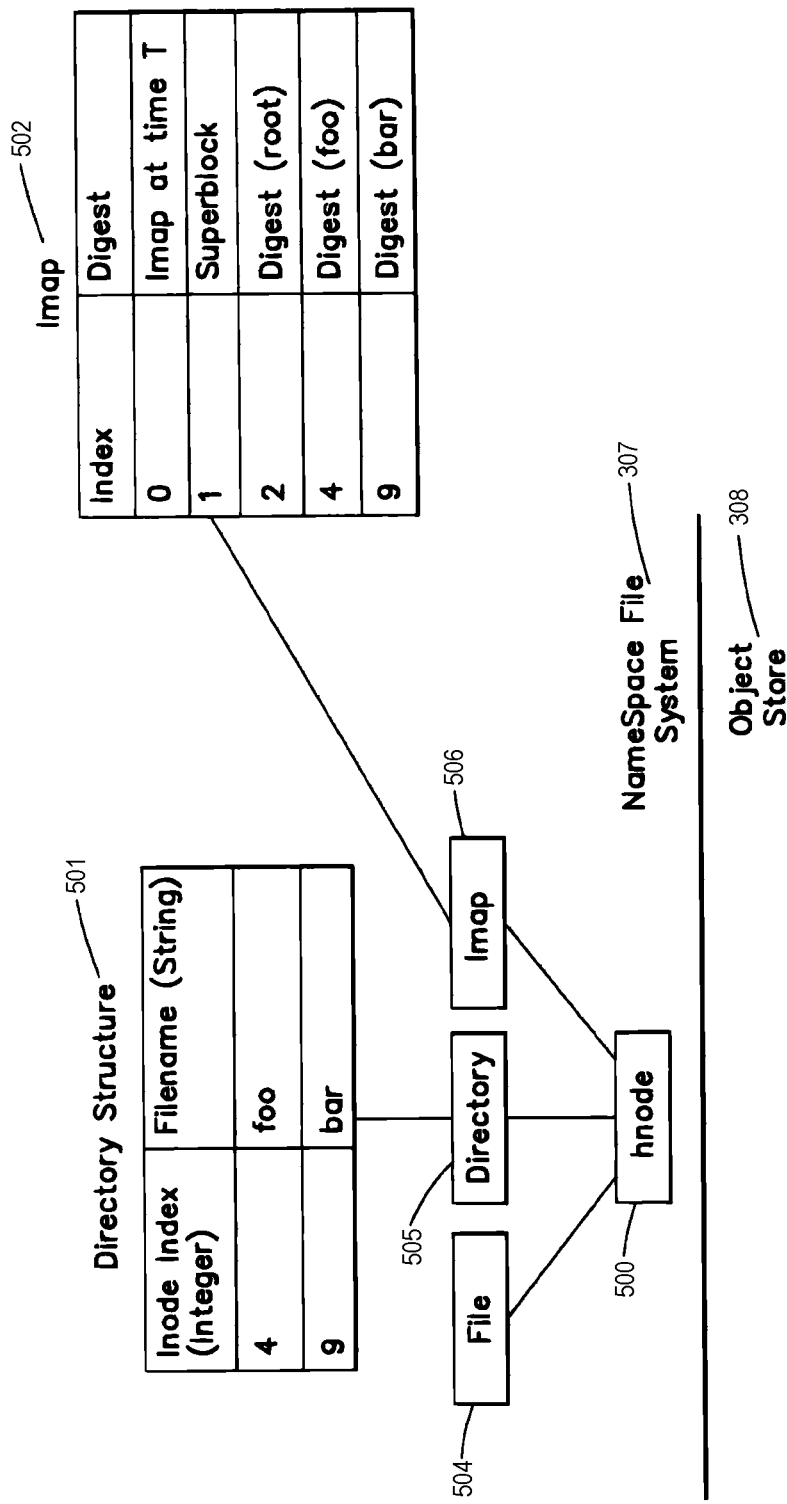
FIG. 5 illustrates a schematic block diagram of one embodiment of a file system utilizing an object store with data structures as needed by the file system, such as files, directories and inode maps.

FIG. 5 illustrates a schematic block diagram of one embodiment of a set of objects grouped together into a data structure, herein referred to as an "hnode", that can be specialized into other data structures as needed by the file system, such as files, directories and imaps. An hnode, as referred to herein, is a data structure that ties together content, such as a file. Sometimes content can be very large (many GB), and does not fit contiguously on a disk or persistent medium. The content is broken up, and stored as discrete units. In the case of traditional file systems, this would be blocks on disk. In the present disclosure, these are object names (signatures). The hnode keeps a list of all the object names in a mapping structure. Linear lists are one example of such a mapping structure, but more complicated indirection tables are also possible.

An hnode comprises object names (signatures) which identify the object's content. Thus, an hnode itself has a well-defined, globally unique, name or signature (the hash of its content).

As illustrated in FIG. 5, an hnode 500 is a randomly addressable sequence of content, similar to a file. How that content is interpreted depends on context. An hnode can be further specialized into files, directories and mode maps (imaps, discussed further below). In the parlance of object oriented programming, the classes file, directory and inode map (imap) are derived from the base class hnode.

A file 504 may be a thin wrapper that makes an hnode appear as a normal POSIX® file that can be opened, closed, read, written, and so forth. A directory 505 is another interpretation of an hnode 500. A directory 505 is a mapping 501 of file system inode numbers (an integer) to file names (a string). The mapping can take various forms, including but not limited to, a linear list, B-trees, hash maps, other tree structures, and the like. If the map 501 is entirely in memory, the map can be serialized and de-serialized.

An imap ("inode map") 502 translates file system inode numbers (from directory 505) into an object digest (i.e., a "digest" being a hash of the object content, and same as a "signature" herein). The object may represent an hnode (and therefore, by extension, a file, directory or other imap), a structure such as a superblock, or other data, such as data associated with a virtual machine. An imap 502 may have reserved locations, such as index 0, index 1, and so forth, for well-known objects. Examples include previous imap(s), file system superblocks, and so forth.

In general, an imap 502 is a mapping (conversion) between an inode number and an object signature (digest). This enables the namespace file system to accommodate (utilize) the inode numbers of a typical file system. By using this indirection table, an inode number can stay constant, but the associated object name (signature) can change as the file data and metadata corresponding to the inode number changes. Since the imap itself is an object, that name too will change as the file system is modified. In this embodiment, all data and metadata of the file system are objects, each having a globally unique content-derived signature, and each file system directory is a tree of the signatures for the objects comprising the file construct (i.e., directory of a file).

Similar to a traditional file system, the root of the file system tree can be at a known inode number in the case of the imap (see index 2 in imap 502 for digest (root)). In this way, a signature of the imap at time t essentially represents a complete "snapshot" of the file system at time t. Increasing the reference count of every visible object underneath this signature locks the snapshot, and prevents it from being deleted regardless of other file system activity.

Once a snapshot signature has been created, it is possible to continue working on the file system (writeable snapshots), or store it locally to create a backup for future use. The snapshot signature can also be sent to and stored at another system (on a remote network node) sitting on a distinct object store to create a remote backup. If an object store can't resolve a read request of a particular signature, to the extent that it is aware of other object stores, it may forward the request to those other object stores. Thus, the snapshot's signature can move to a system whose object store may not fully host all of the snapshot's data (objects), but via the mechanism just described is still fully consistent and usable.

Having disclosed various components of computing systems and file storage systems that may be utilized in the present invention, the disclosure now provides a more detailed description of creating a remote backup using signature comparisons.

Prior Art Remote Backup System

Figure 6:
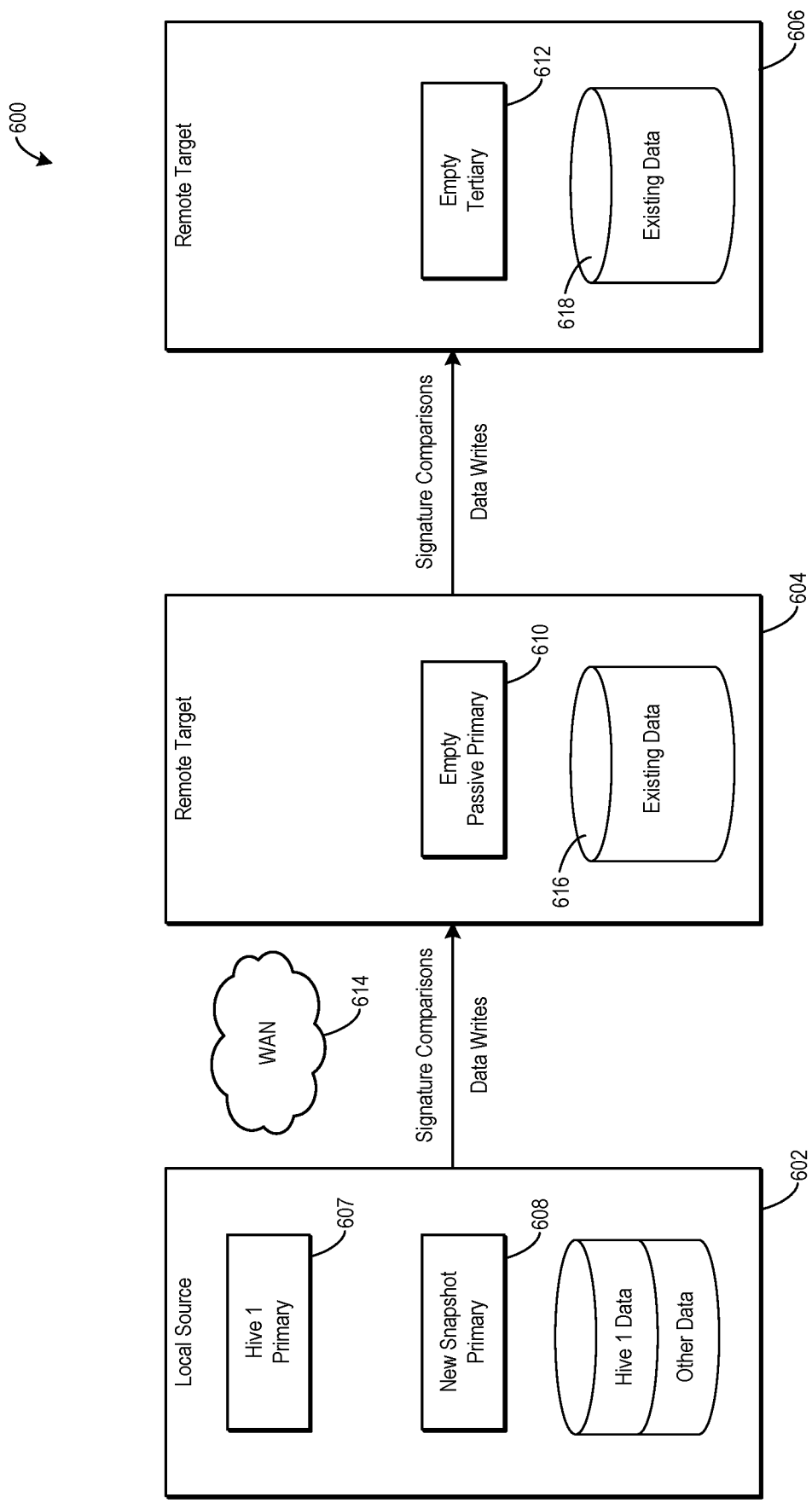
FIG. 6 illustrates an example of a prior art remote backup system.

FIG. 6 illustrates a known system 600 and method for executing a remote replication. In system 600, a control plane can start a replication job, which essentially spawns a replicate task thread or thread group in a file system on a source network node 602. Before the replicate task begins, the control plane can prepare the source network node 602 and one or more remote target network nodes, such as target nodes 604, 606. On source node 602, the control plane can open a hive (dataset) 607 as primary. From here, system 600 can quiesce and roll-up dataset 607. The control plane can then take a snapshot of dataset 607 to produce a new snapshot primary 608 of the dataset 697 which is opened as primary. New snapshot 608 is viewed as the source hive or source dataset, and includes a tree of signatures of the data and metadata objects associated with the new snapshot for remote backup. On target node 604, the control plane can open an empty passive primary hive (dataset) 610 as primary. The control plane can also add dataset 610 as a recipient for a remote backup for source dataset 608. On target node 606, the control plane can open an empty tertiary hive (dataset) 612 as secondary, and can add dataset 612 as a secondary replica for dataset 610.

Once the control plane has set up nodes 602, 604 and 606, the signatures associated with the new snapshot 608 are sent over WAN 614 to target node 604. The signatures associated with the new snapshot 608 are also sent from target node 604 to target node 606 (e.g., over a LAN, a WAN, etc.). Target node 604 can then search existing data 616 to determine which, if any, of the signatures exist on target node 604. Similarly, in some cases, target node 606 can search existing data 618 to determine which, if any, of the signatures exist on target node 606.

After completion of the searching operation, target node 604 can send a response to source node 602 identifying the signatures that do not exist on target node 604 and/or target node 606. Source node 602 can then send data associated with the signatures that do not exist to target node 604 over WAN 614. The sent data can then be incorporated into datasets 610, 612 to create remote backup(s) of the new snapshot 608. Once the replicate task is complete, the control plane can close datasets 608, 610 and 612.

Remote Backup System with Local Signature Comparison

Figure 7:
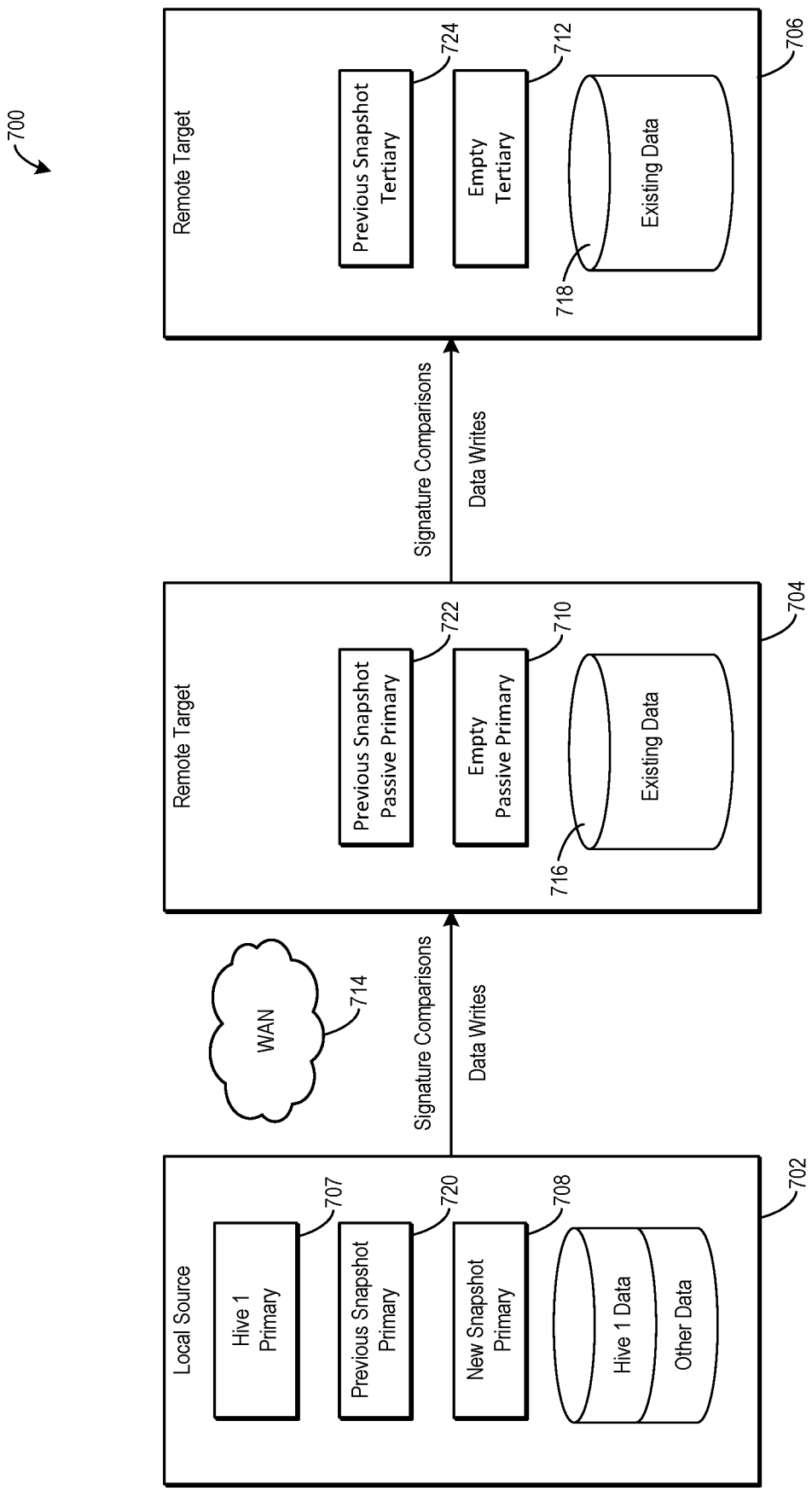
FIG. 7 illustrates an embodiment of a remote backup system according to the present invention utilizing local signature comparison.

FIG. 7 illustrates a system 700 for creating a remote backup using signature comparisons in accordance with one embodiment of the present invention. This new system and method are substantially more efficient, in terms of time and utilization of network resources, compared to the prior art system and method of FIG. 6.

In system 700, a control plane can start a replication job in response to a request to perform a remote backup. Starting a replication job essentially spawns a replicate task thread or thread group in a file system on a local source network node 702. Before the replicate task begins, the control plane can prepare the source network node 702 and one or more remote target network nodes, such as target nodes 704, 706. On the source node 702, control plane can open a hive (dataset) 707 as primary. From here, system 700 can quiesce and roll-up dataset 707. The control plane can then take a snapshot of dataset 707 to produce a new snapshot primary 708 of dataset 707 which is opened as primary. New snapshot 708 is viewed as the source hive or source dataset, and includes a tree of signatures of the data and metadata objects associated with the new snapshot for remote backup.

Control plane also opens a previous snapshot primary 720 as primary. Once open, system 700 can determine if previous snapshot primary 720 includes a snapshot of the most recent remote backup (i.e., the previous snapshot) and its associated data, metadata, signatures, etc. If it does not (e.g., a previous snapshot does not exist), system 700 falls back to a conventional replication job for the remote backup operation (e.g., FIG. 6).

On target node 704, the control plane can open an empty passive primary hive (dataset) 710 as primary. The control plane also opens a hive (dataset) 722 as primary, referred to as previous snapshot passive primary 722, with the root signature of the most recent backup (i.e., the backup corresponding to previous snapshot 720). The control plane can add dataset 710 as a recipient for a remote backup for new snapshot 708. On target node 706, the control plane can open an empty tertiary hive (dataset) 712 as secondary. The control plane also opens a hive (dataset) 724 as secondary, referred to as previous snapshot tertiary 724, with the root signature of the most recent remote backup, and can add dataset 712 to the passive primary dataset's replica set as secondary. Each of datasets 707, 708, 710, 712, 720, 722 and 724 includes signatures of data and metadata of a tree structured file system. The file system data and metadata are stored as objects in an object store, each object having a globally unique content-derived signature, as previously described.

After setting up the source and target nodes, system 700 verifies that the root signature of previous snapshots 722, 724 matches that of previous snapshot 720. When a most recent remote backup exists in previous snapshot 720, its data should, based on prior replication operations, already exist in previous snapshots 722, 724 on target nodes 704, 706. Thus, the source node 702 can perform signature comparisons locally first between new snapshot dataset 708 and previous snapshot 720. Only those signature comparisons that do not match locally need to be sent across WAN 714 to remote target 704 (and tertiary target 706). Then, the remote target can check locally for the signatures, as the signatures may already exist (be stored) on the remote nodes from other datasets.

Next, system 700 syncs metadata by first comparing the metadata signatures of new snapshot 708 against those of previous snapshot 720. This comparison begins from the root signature and moves down the tree structure in an iterative manner (e.g. using depth-first techniques, breadth-first techniques, or combinations thereof). For each signature that does not match, system 700 can send the signature metadata to target nodes 704, 706 over WAN 714.

From here, system 700 checks if the hive's subtree height on new snapshot 708 matches that of previous backup 720. If it does not, system 700 falls back to a conventional replication job for this particular file (e.g., FIG. 6). Otherwise, starting from the root signature and proceeding in a top-down iterative manner, system 700 compares signatures of new snapshot 708 locally against those of previous snapshot 720. Such a comparison process is described in greater detail below with reference to FIGS. 8A, 8B and 8C. If a signature matches locally, the system skips that signature, as the corresponding file data and/or metadata must match on target nodes 704, 706. As recited herein, a signature is considered to match if it has both the same content (e.g., name) and placement within the dataset tree. If the signature does not match locally (i.e., different content or placement), system 700 can send the signature content and placement for comparison at the target nodes 704, 706 over WAN 714 to see if the data and/or metadata already exists remotely from other datasets.

When sending signatures to target nodes 704, 706 for comparisons, one method is to send only signature(s) belonging to a same tree node in a single network message (from the source node to the target node), thus processing node-by-node on a dataset tree. Thus, signatures belonging to different sibling tree nodes would be sent in separate network messages. This could result, for example, in a very small number of signatures (e.g., one) being sent in one network message. Such an approach may be less efficient because of the large overhead of each message compared to the relatively small size of signatures being sent, and because of the large number of messages having a long round-trip time, especially across a WAN.

Accordingly, in one embodiment system 700 can batch many signatures, even signatures belonging to different sibling tree nodes, in a single message. In doing so, system 700 decouples the sending of messages from the node-by-node processing of the dataset trees. Signatures to be sent can be buffered, and are then packed and sent in one network message depending on how many signatures can fit into the buffer. System 700 can send batched signatures asynchronously to the target node for comparison.

Once the signatures are received at target node 704, they can be sent from target node 704 to tertiary target node 706 (e.g., over a LAN, a WAN, etc.). Doing so allows the remote backup to provide high availability. System 700 has already determined that no signature matches (at the same tree position) exists remotely at the target(s), as it would already have matched locally. Thus, target nodes 704, 706 can search existing data 716, 718 to determine if the signatures exist (are stored) at the remote nodes. If a signature is found on either of target nodes 704, 706, system 700 is done processing that signature, as the corresponding file data is available on the target nodes. Otherwise, the signature is not stored remotely, and target node 704 can send a response to source node 702 identifying that the signature does not exist on target nodes 704, 706. In some cases, target node 704 can batch responses to source node 702. If the signature that does not exist remotely corresponds to a metadata signature, system 700 can continue comparing its dataset tree child signatures. If it corresponds to a file data signature, system 700 can batch the data associated with the signature for sending to target node 704. The system can send batched data asynchronously to target node 704, which can, in some cases, transfer the data to target node 706. The sent data can be incorporated into a remote backup (i.e., datasets 710, 712) at target nodes 704, 706.

The present invention is of particular benefit in remote backups where a large amount of signature comparisons (with the previous snapshot) would result in matches. In such cases, system 700 reduces traffic over WAN 714, and could also reduce backup time due to avoiding high latency with large amount of local signature matches. The exact impact of extra signature comparisons would depend on dataset metadata reads, as well as other factors, on the source node 702.

Preliminary tests suggest that backups of virtual machine disks (VMDKs) with heavy random writes, such as from IoMeter, align with the preferred use cases. One example is backups using IoMeter 64K random writes with dedupable compressible data. Each backup was preceded with 20 minutes of writes. The first backup was with no data on the remote datastore (target node). This scenario demonstrates how many of the signatures comparisons matched on the remote datacenter. The table below illustrates the potential benefits of the presently disclosed system compared to previous approaches.

TABLE 1

Backups using IoMeter 64K random writes with dedupable compressible data

|  | Backup 1 | Backup 2 |
| --- | --- | --- |
| SigsProcessed | 37,949,424 | 31,016,232 |
| SigsMatched | 30,616,946 | 29,634,442 |
| MatchPercentage | 80.0%, | 95.5% |
| Time | 01:04:00 | 00:14:00 |
| Size | 440 GB | 440 GB |
| Sent | 37.9 GB | 1 GB |

As a non-limiting example, below is an example interface for implementing a portion of the presently disclosed system:

void FileSystemManager::replicatePeer(const HiveId& hiveId, const NodeId& target, const RebuildComplete& finished, const HiveId& prevBackupHiveId=NULL_GUID);

If prevBackupHiveId is NULL_GUID, the system can perform file system replication in a conventional manner for the entire remote backup operation. Otherwise, if the prevBackupHiveId (snapshot) is provided (stored locally), the system can attempt to perform local signature comparisons using the previous backup snapshot. The previous backup snapshot and dataset must already be open by the control plane as a primary on the source node before calling this API, and must remain open during replication. Also, the target datasets (e.g., passive primary and tertiary) should already be set to the same root signature as the previous backup snapshot by the control plane. Otherwise, file system replication will fall back to a conventional replication job for the remote backup operation. The API can be modified to check first for an understood or assumed default previous backup dataset or snapshot if none is provided.

The file system assumes that there is no concurrent I/O on the previous backup dataset during replication, similar to the assumption on the source dataset. The file system may allow the control plane to run multiple replications from a same snapshot. Any writes to the previous backup snapshot or dataset could cause incorrect data to be backed up to target datasets.

In one embodiment, the system can keep a snapshot of the most recent remote backup on the source node, and ensure that subsequent remote backups go to a same pair of target nodes. On the source node, the system should open the most recent remote backup snapshot or dataset if one exists, and pass (or otherwise indicate) the hive ID to svtfs::FileSystemManager::replicatePeer API. During replication, this dataset should remain open, and the file system assumes that there is no concurrent I/O to it, or at least no writes. On the target passive primary node and target tertiary node, the system opens a new empty dataset, setting the dataset's root signatures to that of the most recent remote backup (before calling svtfs::FileSystemManager::replicatePeer API on the source).

Figure 8A:
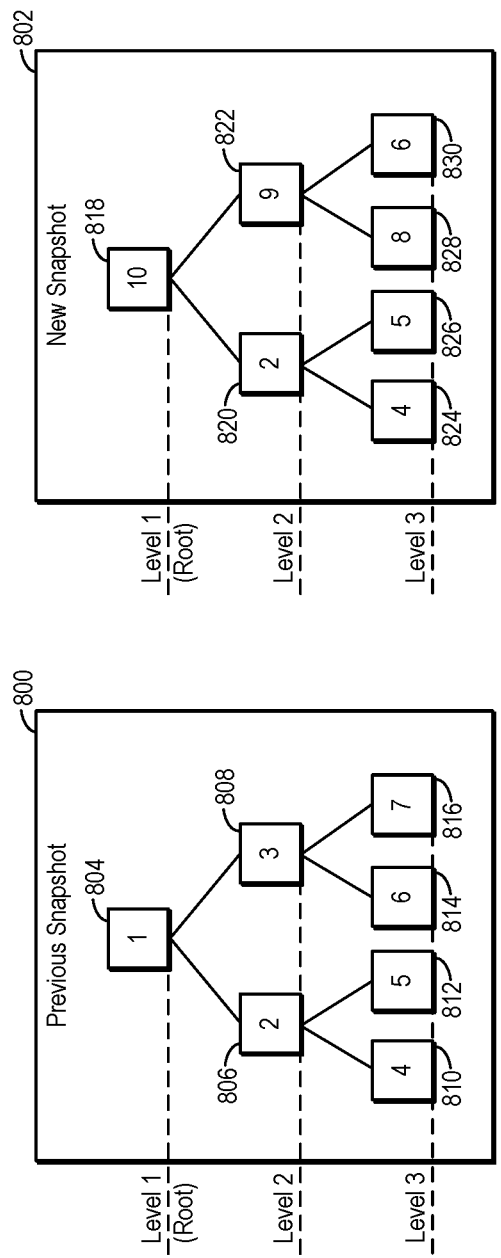
FIG. 8A illustrates a schematic block diagram of datasets including a previous snapshot and a new snapshot for remote backup according to one embodiment of the invention.

FIG. 8A illustrates an exemplary dataset 800 including a tree of signatures corresponding to data and metadata objects associated with the most recent remote backup (i.e., the previous snapshot). In addition, FIG. 8A shows a dataset 802 including a tree of signatures corresponding to data and metadata objects associated with a new snapshot intended for remote backup. As illustrated, each signature within datasets 800, 802 forms an individual node in the respective tree. For example, signatures "1" and "10" form root tree nodes 804 and 818, respectively, at the topmost level of datasets 800, 802 (denoted Level 1 (root)). Branching from root nodes 804, 818 are a plurality of child tree nodes (i.e., nodes 806, 808, 820 and 822) located at an intermediate level of datasets 800, 802 (denoted Level 2). Finally, branching from each of nodes 806, 808, 820 and 822 are a plurality of child tree nodes (i.e., nodes 810, 812, 814, 816, 824, 826, 828 and 830) located at a bottom level of datasets 800, 802 (denoted Level 3). Because nodes 810, 812, 814, 816, 824, 826, 828 and 830 have no further metadata children (i.e., they comprise the bottom of their respective tree), they are known as leaf tree nodes.

Figure 8B:
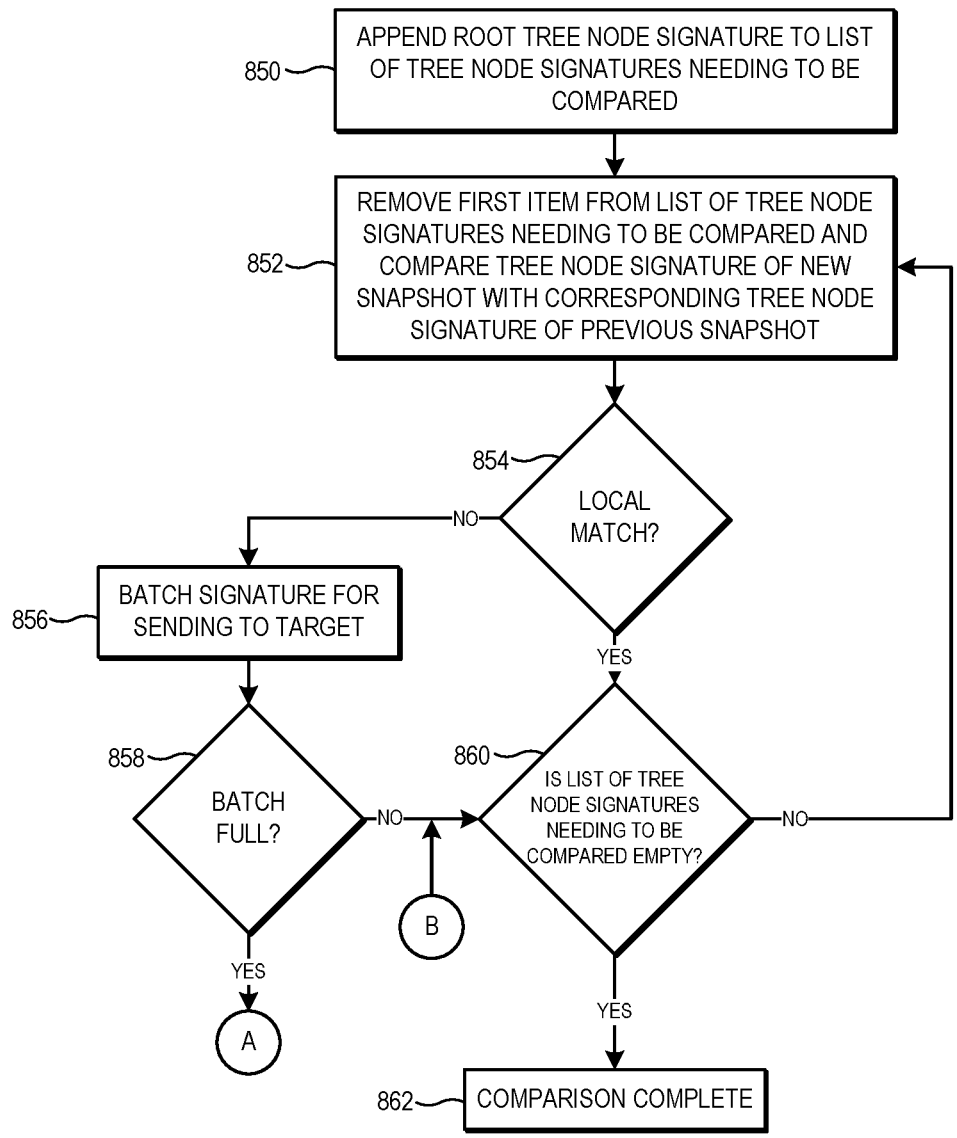
FIG. 8B illustrates an exemplary method for performing an iterative top-down signature comparison.
Figure 8C:
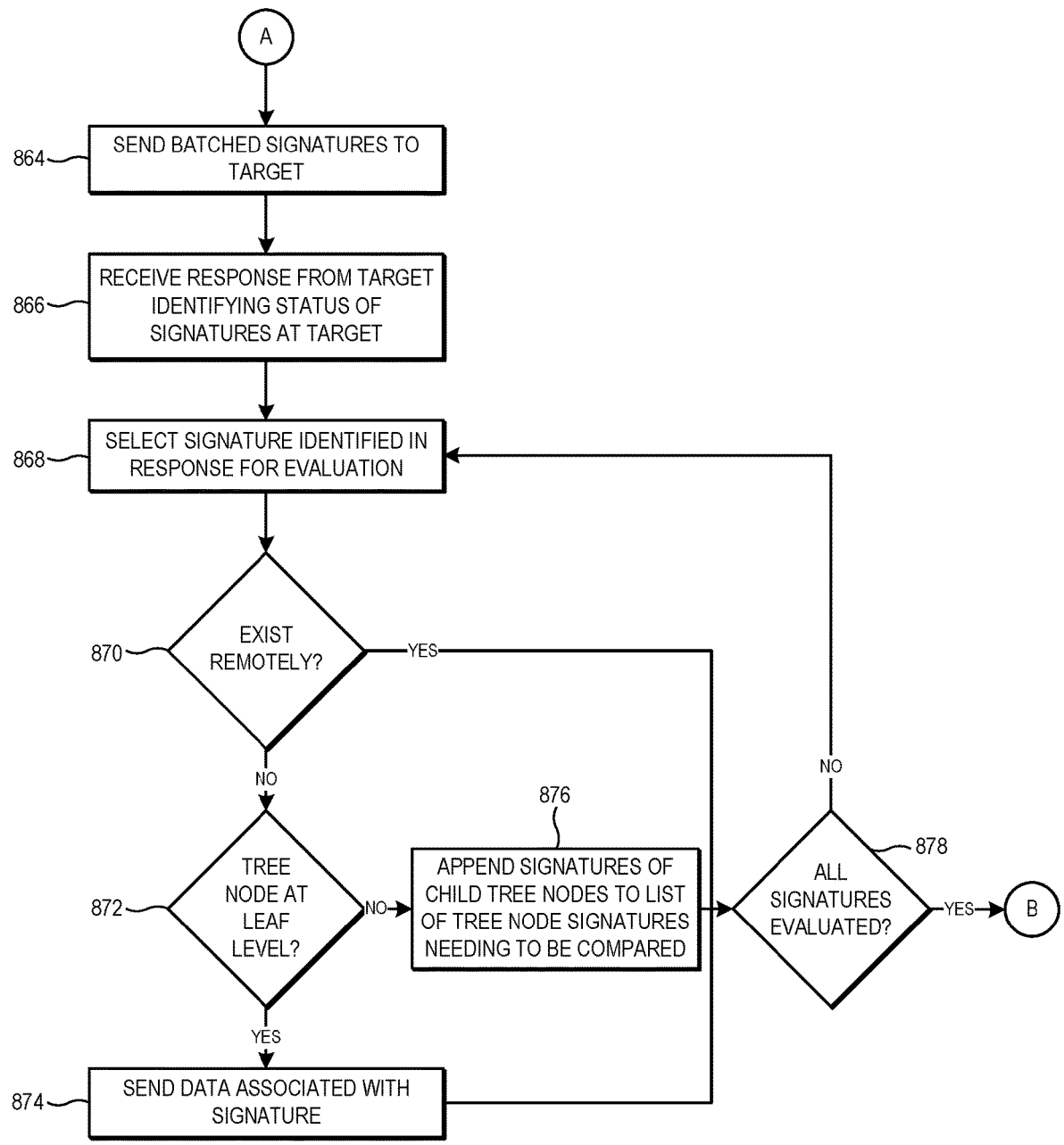
FIG. 8C illustrates an exemplary subroutine of the method shown in FIG. 8B for sending batched signatures to a remote target and analyzing the response.

In order to determine differences between a new snapshot and a previous snapshot, an iterative top-down signature comparison between the signatures of the previous snapshot and the signatures of the current snapshot can be performed as illustrated in FIG. 8B. The method described in FIG. 8B is not intended to be limiting, and alternative embodiments can use depth-first techniques, breadth-first techniques, or combinations thereof when performing the signature comparison. For clarity of explanation, the method depicted in FIG. 8B is described in relation to a system configured to practice the method (e.g., system 700) and with reference to datasets 800, 802 illustrated in FIG. 8A.

The method begins with appending the root tree node signature of the new snapshot to a list of tree node signatures needing to be compared in step 850. For example, the signature ("10") of root tree node 818 in dataset 802 can be appended to the list of tree node signatures needing to be compared. Next, at step 852, the system (e.g., system 700) can remove the first item from the list of tree node signatures needing to be compared and can perform a local comparison between the tree node signature of the new snapshot and the corresponding child tree node signature of the previous snapshot. For example, the signature ("10") of root tree node 818 in dataset 802 can be removed from the list and can be compared locally (e.g., on source 702 in system 700) with the signature ("1") of root tree node 804 in dataset 800.

Based on the local comparison, system 700 can determine whether both the content and placement of the signature in the new snapshot matches that of the previous snapshot (step 854). If the signature matches, system 700 can determine that no further comparisons are necessary for that signature (or its child signatures, if any), and can proceed to step 860 without sending the signature to a remote target. For example, because signature ("2") of child tree node 820 in dataset 802 matches, both in content and placement in the tree, with signature ("2") of child tree node 806 in dataset 800, the system can determine that the signature ("2") in node 820, as well as signatures ("4") and ("5") in leaf nodes 824 and 826, do not need to be sent to a remote target (e.g., target nodes 704, 706). If the signature does not match in step 854, system 700 can batch the signature to send to the remote target (e.g., target nodes 704, 706 in system 700) in step 856.

After batching the signature to send to the remote target, system 700 can determine if the batch is full (step 858). If the batch has room for at least one more signature, system 700 can proceed to step 860. Otherwise, if the batch is full, system 700 can move into the subroutine illustrated in FIG. 8C and can send the batched signatures (synchronously or asynchronously) to the remote target (step 864). At step 866, system 700 can receive a response from the remote target identifying the status of the sent signatures at the remote target (i.e., whether the signatures exist on the remote target). From here, system 700 can select a signature identified in the response for evaluation (step 868), and can determine whether the response identifies the selected signature as existing or not (step 870). If the response indicates that the selected signature exists remotely, the system determines that it does not need to send the data associated with the signature to the remote target and can proceed to step 878. Otherwise, if the selected signature does not exist remotely, system 700 can determine in step 872 whether the tree node associated with the selected signature is at the leaf level (e.g., level 3 in FIG. 8A). If the tree node of the selected signature is at the leaf level, system 700 can send the data associated with the signature to the remote network node for incorporation within a remote snapshot (step 874) and can continue to step 878. If the selected signature does not correspond to a leaf node, system 700 can append the signature(s) of the child tree node(s) associated with the selected signature to the list of signatures needing to be compared (step 876). From here, system 700 can proceed to step 878. At step 878, system 700 can determine whether it has evaluated all the signatures identified in the response from the target node. If not, system 700 can return to step 868 to select a new signature and repeat the above-described process. Otherwise, system 700 can advance to step 860.

Referring back to FIG. 8B, at step 860, system 700 can determine if the list of tree node signatures that need to be compared is empty. If the list is empty, system 700 can indicate that the comparison is complete (step 862). Otherwise, if the list is not empty, system 700 can return to step 852 and can repeat the comparison process until system 700 determines that the signature comparison between the new snapshot and the previous snapshot is complete.

Computer System Architecture

Figure 9:
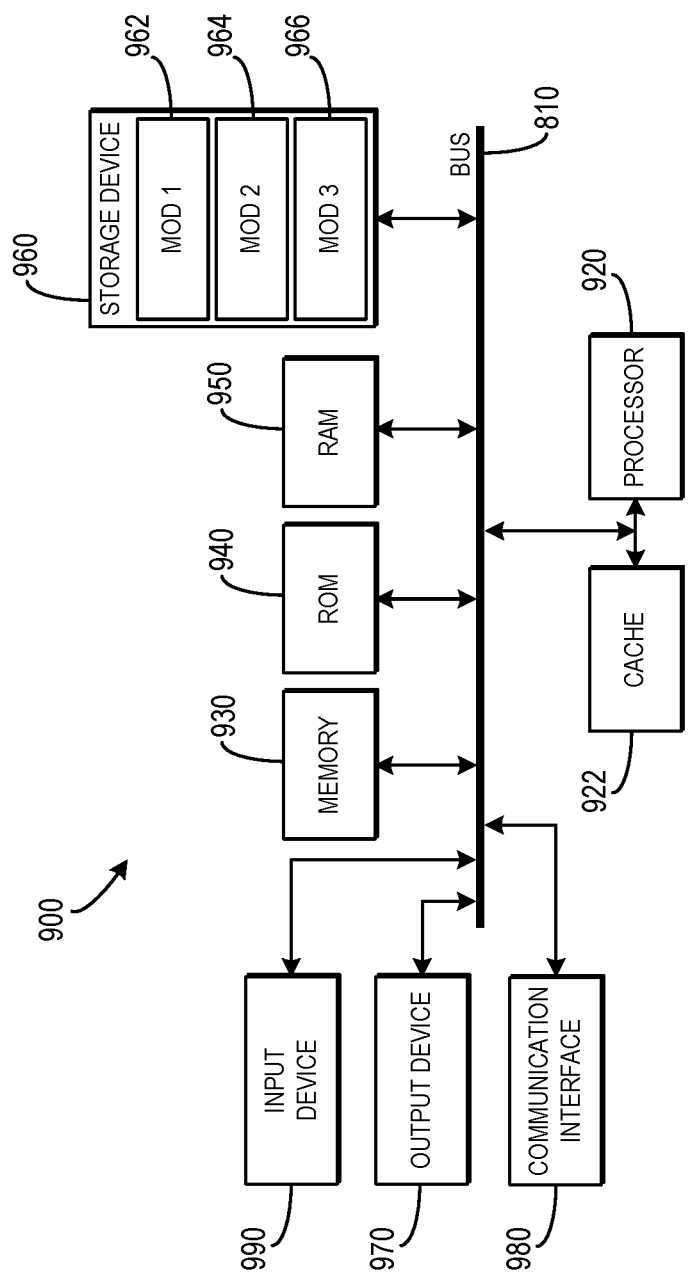
FIG. 9 illustrates a schematic block diagram of an exemplary computer system embodiment.

With reference to FIG. 9, an exemplary system and/or computing device 900 includes a processing unit (CPU or processor) 920 and a system bus 910 that couples various system components including the system memory 930 such as read only memory (ROM) 940 and random access memory (RAM) 950 to the processor 920. The system 900 can include a cache 922 of high-speed memory connected directly with, in close proximity to, or integrated as part of the processor 920. The system 900 copies data from the memory 930 and/or the storage device 960 to the cache 922 for quick access by the processor 920. In this way, the cache provides a performance boost that avoids processor 920 delays while waiting for data. These and other modules can control or be configured to control the processor 920 to perform various operations or actions. Other system memory 930 may be available for use as well. The memory 930 can include multiple different types of memory with different performance characteristics. It can be appreciated that the disclosure may operate on a computing device 900 with more than one processor 920 or on a group or cluster of computing devices networked together to provide greater processing capability. The processor 920 can include any general purpose processor and a hardware module or software module, such as module 1 962, module 2 964, and module 3 966 stored in storage device 960, configured to control the processor 920 as well as a special-purpose processor where software instructions are incorporated into the processor. The processor 920 may be a self-contained computing system, containing multiple cores or processors, a bus, memory controller, cache, etc. A multi-core processor may be symmetric or asymmetric. The processor 920 can include multiple processors, such as a system having multiple, physically separate processors in different sockets, or a system having multiple processor cores on a single physical chip. Similarly, the processor 920 can include multiple distributed processors located in multiple separate computing devices, but working together such as via a communications network. Multiple processors or processor cores can share resources such as memory 930 or the cache 922, or can operate using independent resources. The processor 920 can include one or more of a state machine, an application specific integrated circuit (ASIC), or a programmable gate array (PGA) including a field PGA.

The system bus 910 may be any of several types of bus structures including a memory bus or memory controller, a peripheral bus, and a local bus using any of a variety of bus architectures. A basic input/output (BIOS) stored in ROM 940 or the like, may provide the basic routine that helps to transfer information between elements within the computing device 900, such as during start-up. The computing device 900 further includes storage devices 960 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 960 can include software modules 962, 964, 966 for controlling the processor 920. The system 900 can include other hardware or software modules. The storage device 960 is connected to the system bus 910 by a drive interface. The drives and the associated computer-readable storage devices provide nonvolatile storage of computer-readable instructions, data structures, program modules and other data for the computing device 900. In one aspect, a hardware module that performs a particular function includes the software component stored in a tangible computer-readable storage device in connection with the necessary hardware components, such as the processor 920, bus 910, display 970, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 900 is a small, handheld computing device, a desktop computer, or a computer server. When the processor 920 executes instructions to perform "operations", the processor 920 can perform the operations directly and/or facilitate, direct, or cooperate with another device or component to perform the operations.

Although the exemplary embodiment(s) described herein employs the hard disk 960, other types of computer-readable storage devices which can store data that are accessible by a computer, such as magnetic cassettes, flash memory cards, digital versatile disks (DVDs), cartridges, random access memories (RAMs) 950, read only memory (ROM) 940, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 900, an input device 990 represents any number of input mechanisms, such as a microphone for speech, a touch-sensitive screen for gesture or graphical input, keyboard, mouse, motion input, speech and so forth. An output device 970 can also be one or more of a number of output mechanisms known to those of skill in the art. In some instances, multimodal systems enable a user to provide multiple types of input to communicate with the computing device 900. The communications interface 980 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 920. The functions these blocks represent may be provided through the use of either shared or dedicated hardware, including, but not limited to, hardware capable of executing software and hardware, such as a processor 920, that is purpose-built to operate as an equivalent to software executing on a general purpose processor. For example the functions of one or more processors presented in FIG. 9 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 940 for storing software performing the operations described below, and random access memory (RAM) 950 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 900 shown in FIG. 9 can practice all or part of the recited methods, can be a part of the recited systems, and/or can operate according to instructions in the recited tangible computer-readable storage devices. Such logical operations can be implemented as modules configured to control the processor 920 to perform particular functions according to the programming of the module. For example, FIG. 9 illustrates three modules, namely Mod1 962, Mod2 964 and Mod3 966, which are modules configured to control the processor 920. These modules may be stored on the storage device 960 and loaded into RAM 950 or memory 930 at runtime or may be stored in other computer-readable memory locations.

One or more parts of the example computing device 900, up to and including the entire computing device 900, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 920 can include all types of processors disclosed herein, including a virtual processor. However, when referring to a virtual processor, the processor 920 includes the software components associated with executing the virtual processor in a virtualization layer and underlying hardware necessary to execute the virtualization layer. The system 900 can include a physical or virtual processor 920 that receive instructions stored in a computer-readable storage device, which cause the processor 920 to perform certain operations. When referring to a virtual processor 920, the system also includes the underlying physical hardware executing the virtual processor 920.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to speech dialog systems generally and can be used for any application thereof. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

The invention claimed is:

1. A system comprising a source network node and a remote network node, the source network node having a processor and a memory storing instructions which, when executed by the processor, cause the processor to:
receive a command to duplicate a dataset located on the source network node to the remote network node, the dataset comprising signatures of data and metadata in a tree structured file system, wherein the data and metadata are stored as objects in an object store, each object having a content-derived signature;
in response to receipt of the command, access, on the source network node, signatures of the data and the metadata of the dataset in a previously stored snapshot of the dataset and the signatures of the data and the metadata of the dataset in a current snapshot of the dataset, wherein the signatures of the data and the metadata of the dataset in the previously stored snapshot are in a tree structured file system, and wherein the previously stored snapshot corresponds to a remote snapshot of the dataset previously stored at the remote network node;
perform, at the source network node, a local signature comparison between the previously stored snapshot and the current snapshot to identify one or more signatures that do not match between the previously stored snapshot and the current snapshot, wherein the local signature comparison is an iterative top-down comparison beginning at the root of a tree of the tree structured file system, and wherein the signatures that do not match have at least one of different content or different placement in the tree;
send the signatures that do not match to the remote network node;
receive, from the remote network node, a response of whether the signatures that do not match exist at the remote network node; and
based on a determination that the signatures that do not match do not exist at the remote network node, send data associated with the signatures that do not match to the remote network node for incorporation within a current remote snapshot.

2. The system of claim 1, wherein the source network node and the remote network node communicate across a wide area network (WAN).

3. The system of claim 2, wherein the signatures that do not match are sent asynchronously across the WAN.

4. The system of claim 2, wherein the signatures that do not match are batched prior to sending across the WAN.

5. The system of claim 4, wherein the batched signatures include signatures from different sibling nodes of the tree.

6. A method for generating a remote backup copy on a remote network node of a dataset located on a source network node, the method comprising:
receiving a command to duplicate the dataset located on the source network node to the remote network node, the dataset comprising signatures of data and metadata in a tree structured file system, wherein the data and metadata are stored as objects in an object store, each object having a content-derived signature;
in response to receipt of the command, accessing, on the source network node, signatures of the data and the metadata of the dataset in a previously stored snapshot of the dataset and the signatures of the data and the metadata of the dataset in a current snapshot of the dataset, wherein the signatures of the data and the metadata of the dataset in the previously stored snapshot are in a tree structured file system, and wherein the previously stored snapshot corresponds to a remote snapshot of the dataset previously stored at the remote network node;
performing, at the source network node, a local signature comparison between the previously stored snapshot and the current snapshot to identify one or more signatures that do not match between the previously stored snapshot and the current snapshot, wherein the local signature comparison is an iterative top-down comparison beginning at the root of a tree of the tree structured file system, and wherein the signatures that do not match have at least one of different content or different placement in the tree;
sending the signatures that do not match to the remote network node;
receiving, from the remote network node, a response of whether the signatures that do not match exist at the remote network node; and
based on a determination that the signatures that do not match do not exist at the remote network node, sending data associated with the signatures that do not match to the remote network node for incorporation within a current remote snapshot.

7. The method of claim 6, wherein the source network node and the remote network node communicate across a wide area network (WAN).

8. The method of claim 7, wherein the signatures that do not match are sent asynchronously across the WAN.

9. The method of claim 7, further comprising:
batching the signatures that do not match prior to sending across the WAN.

10. The method of claim 9, wherein the batched signatures include signatures from different sibling nodes of the tree.

11. A non-transitory computer-readable storage medium having stored therein instructions which, when executed by a processor, cause the processor to:
receive a command to duplicate a dataset located on a source network node to a remote network node, the dataset comprising signatures of data and metadata in a tree structured file system, wherein the data and metadata are stored as objects in an object store, each object having a content-derived signature;
in response to receipt of the command, access, on the source network node, signatures of the data and the metadata of the dataset in a previously stored snapshot of the dataset and the signatures of the data and the metadata of the dataset in a current snapshot of the dataset, wherein the signatures of the data and the metadata of the dataset in the previously stored snapshot are in a tree structured file system, and wherein the previously stored snapshot corresponds to a remote snapshot of the dataset previously stored at the remote network node;

perform, at the source network node, a local signature comparison between the previously stored snapshot and the current snapshot to identify one or more signatures that do not match between the previously stored snapshot and the current snapshot, wherein the local signature comparison is an iterative top-down comparison beginning at the root of a tree of the tree structured file system, and wherein the signatures that do not match have at least one of different content or different placement in the tree;

send the signatures that do not match to the remote network node;

receive, from the remote network node, a response of whether the signatures that do not match exist at the remote network node; and based on a determination that the signatures that do not match do not exist at the remote network node, send data associated with the signatures that do not match to the remote network node for incorporation within a current remote snapshot.

12. The non-transitory computer-readable storage medium of claim 11, wherein the source network node and the remote network node communicate across a wide area network (WAN).

13. The non-transitory computer-readable storage medium of claim 12, wherein the signatures that do not match are sent asynchronously across the WAN.

14. The non-transitory computer-readable storage medium of claim 12, storing additional instructions which, when executed by the processor, cause the processor to perform operations comprising:

batching the signatures that do not match prior to sending across the WAN.

15. The non-transitory computer-readable storage medium of claim 14, wherein the batched signatures include signatures from different sibling nodes of the tree.

16. The system of claim 1, wherein remote network node is to, based on receipt of the signatures that do not match from the source network node, perform a search for the signatures that do not match and send the response of whether the signatures that do not match exist at the remote network node to the source network node.

17. The system of claim 1, wherein each of the content-derived signatures of the objects comprises a cryptographic digest of an entire content of an object.

18. The method of claim 6, wherein each of the content-derived signatures of the objects comprises a cryptographic digest of an entire content of an object.

19. The method of claim 6, wherein remote network node is to, based on receipt of the signatures that do not match from the source network node, perform a search for the signatures that do not match and send the response of whether the signatures that do not match exist at the remote network node to the source network node.

20. The non-transitory computer-readable storage medium of claim 11, wherein each of the content-derived signatures of the objects comprises a cryptographic digest of an entire content of an object.

\* \* \* \* \*